(12) United States Patent
Carmichael et al.

(10) Patent No.: US 9,089,978 B2
(45) Date of Patent: Jul. 28, 2015

(54) TWO STAGE FORCE MULTIPLIER TIN SNIPS

(71) Applicant: I.D.L. Tools International, LLC, Summit, NJ (US)

(72) Inventors: Eric B. Carmichael, Mountain Lakes, NJ (US); Brett P. Seber, Vista, CA (US); Wesley James Torn, Escondido, CA (US)

(73) Assignee: I.D.L. Tools International, LLC, Summit, NJ (US)

( * ) Notice: Subject to any disclaimer, the term of this patent is extended or adjusted under 35 U.S.C. 154(b) by 0 days.

(21) Appl. No.: 14/293,456

(22) Filed: Jun. 2, 2014

(65) Prior Publication Data

US 2014/0298661 A1   Oct. 9, 2014

Related U.S. Application Data

(63) Continuation-in-part of application No. 11/937,113, filed on Nov. 8, 2007, now Pat. No. 8,739,415.

(60) Provisional application No. 60/865,612, filed on Nov. 13, 2006.

(51) Int. Cl.
*B26B 13/26* (2006.01)
*B23D 29/02* (2006.01)
*A01G 3/02* (2006.01)

(52) U.S. Cl.
CPC . *B26B 13/26* (2013.01); *A01G 3/02* (2013.01); *B23D 29/026* (2013.01); *A01G 3/021* (2013.01)

(58) Field of Classification Search
CPC ........ B26B 13/00; B26B 13/12; B26B 13/26; B26B 13/28; B26B 13/285
USPC .......... 30/244, 254, 258, 341, 250–252, 30/186–188, 190, 191, 193, 143, 151, 30/155–157, 162, 164; D8/5, 52
See application file for complete search history.

(56) References Cited

U.S. PATENT DOCUMENTS

| | | | |
|---|---|---|---|
| 707,822 A | 8/1902 | Casterlin | |
| 832,804 A | 10/1906 | Oneal et al. | |
| 1,475,273 A | 11/1923 | Bernard | |
| 1,497,969 A | 6/1924 | Arbogast | |
| 1,586,297 A * | 5/1926 | Du Bois | 72/387 |
| 1,607,470 A * | 11/1926 | McKenney | 30/252 |
| 1,860,290 A | 5/1932 | Lebherz | |
| 2,906,155 A | 9/1959 | Miller | |
| 3,091,841 A * | 6/1963 | Wurzel | 29/229 |
| 3,851,389 A | 12/1974 | Swanson | |
| 4,569,260 A * | 2/1986 | Henry | 81/378 |
| 4,982,500 A * | 1/1991 | Ramani | 30/254 |
| 5,058,277 A | 10/1991 | Kishimoto | |
| 6,457,239 B1 | 10/2002 | McLaughlin | |

(Continued)

*Primary Examiner* — Phong Nguyen
(74) *Attorney, Agent, or Firm* — Kelly & Kelley, LLP

(57) ABSTRACT

Two-stage force multiplier tin snips are provided which have a pair of cutting blades and associated tangs, both being pivotable about a cutting axis. Each respective tang is coupled to a pair of handles by a pair of respective tang pins. The handles are pivotably attached to one another about an adjustable handle axis. The handle axis is adjustable between an upper position and a lower position to provide a mechanism for changing a force multiplier of the cutting blades. The handle axis may be a sliding axis disposed in longitudinal slots on the handles. The handle axis may also be upper and lower fixed pins that are slidable in lateral slots.

9 Claims, 18 Drawing Sheets

(56) References Cited

U.S. PATENT DOCUMENTS

| | | | |
|---|---|---|---|
| 7,810,242 B1* | 10/2010 | Lynch | 30/254 |
| 2006/0053948 A1 | 3/2006 | Mahendra et al. | |
| 2011/0296694 A1* | 12/2011 | Huang | 30/254 |
| 2012/0060377 A1* | 3/2012 | Huang | 30/244 |
| 2012/0186087 A1* | 7/2012 | Huang | 30/252 |

* cited by examiner

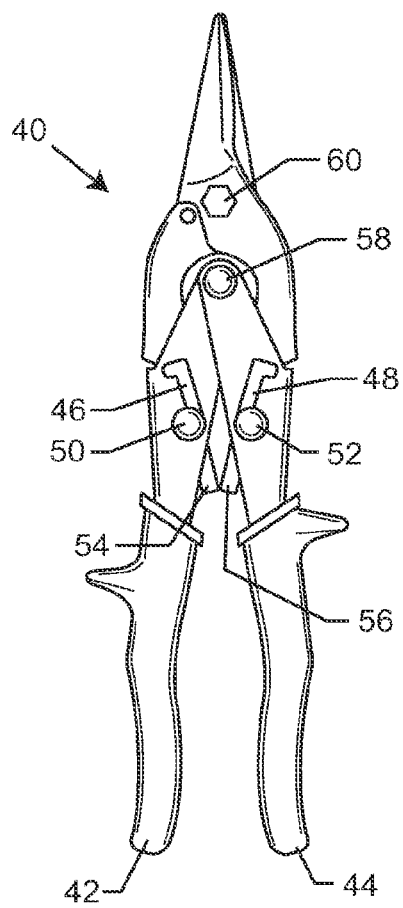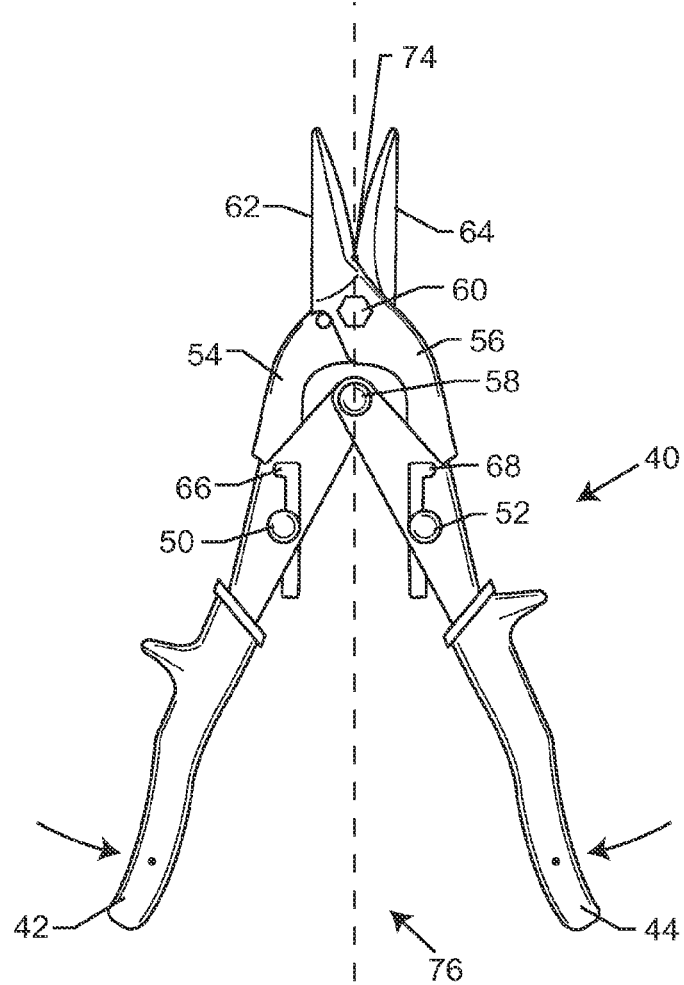
FIG. 1
FIG. 2

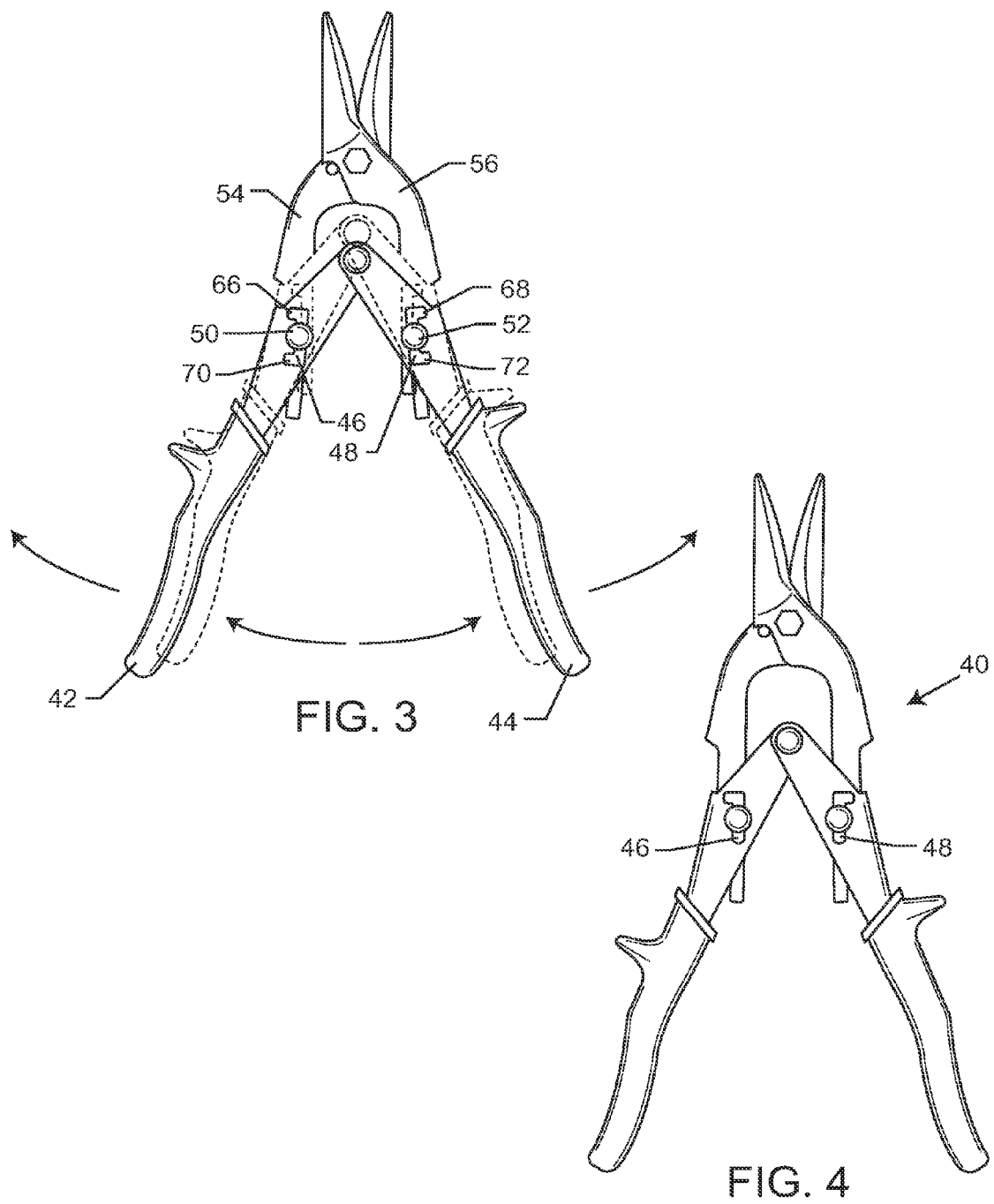

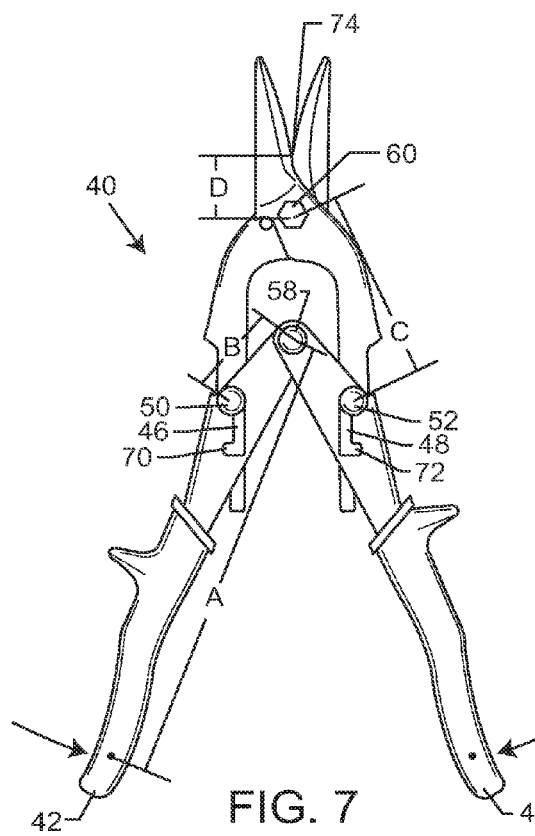
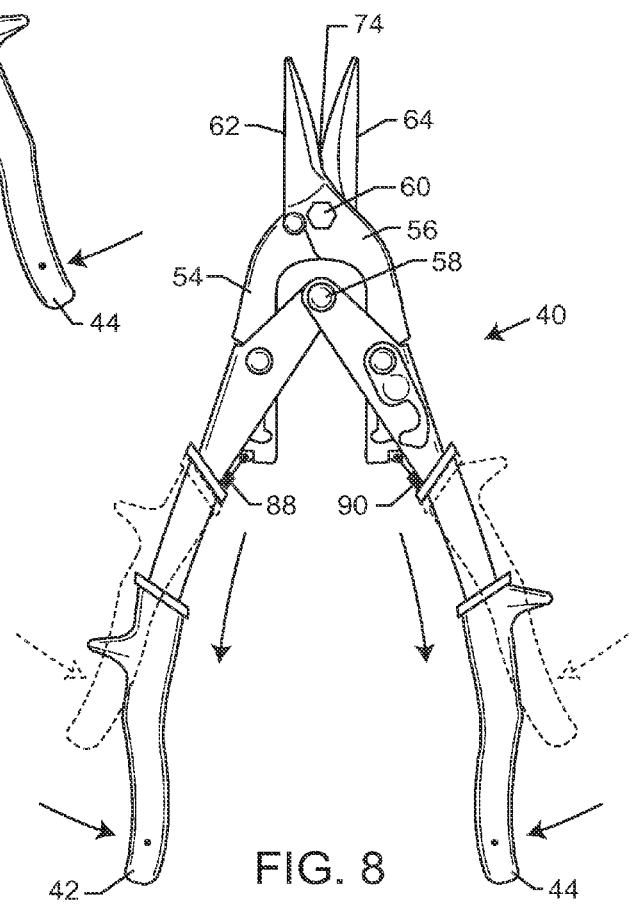

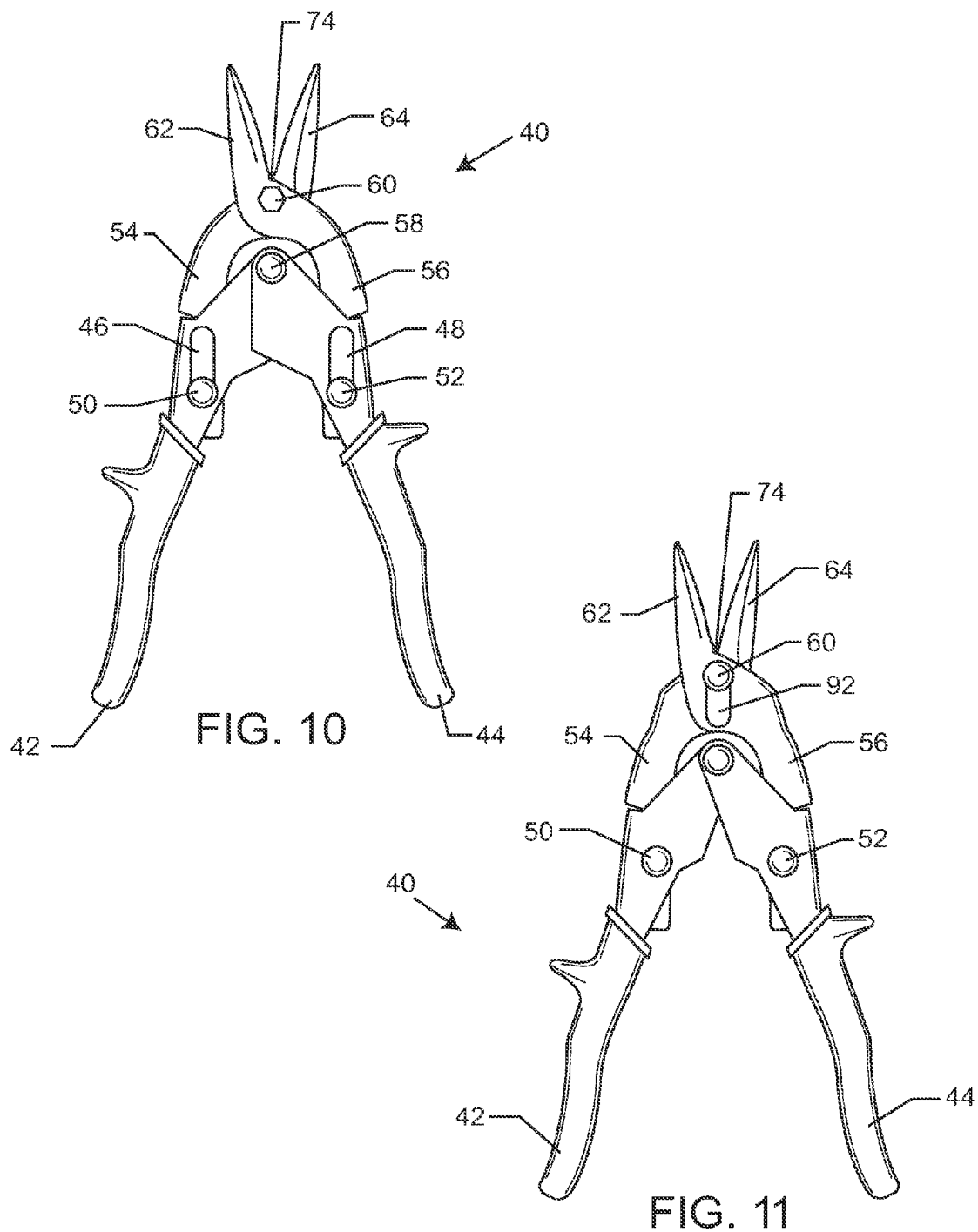

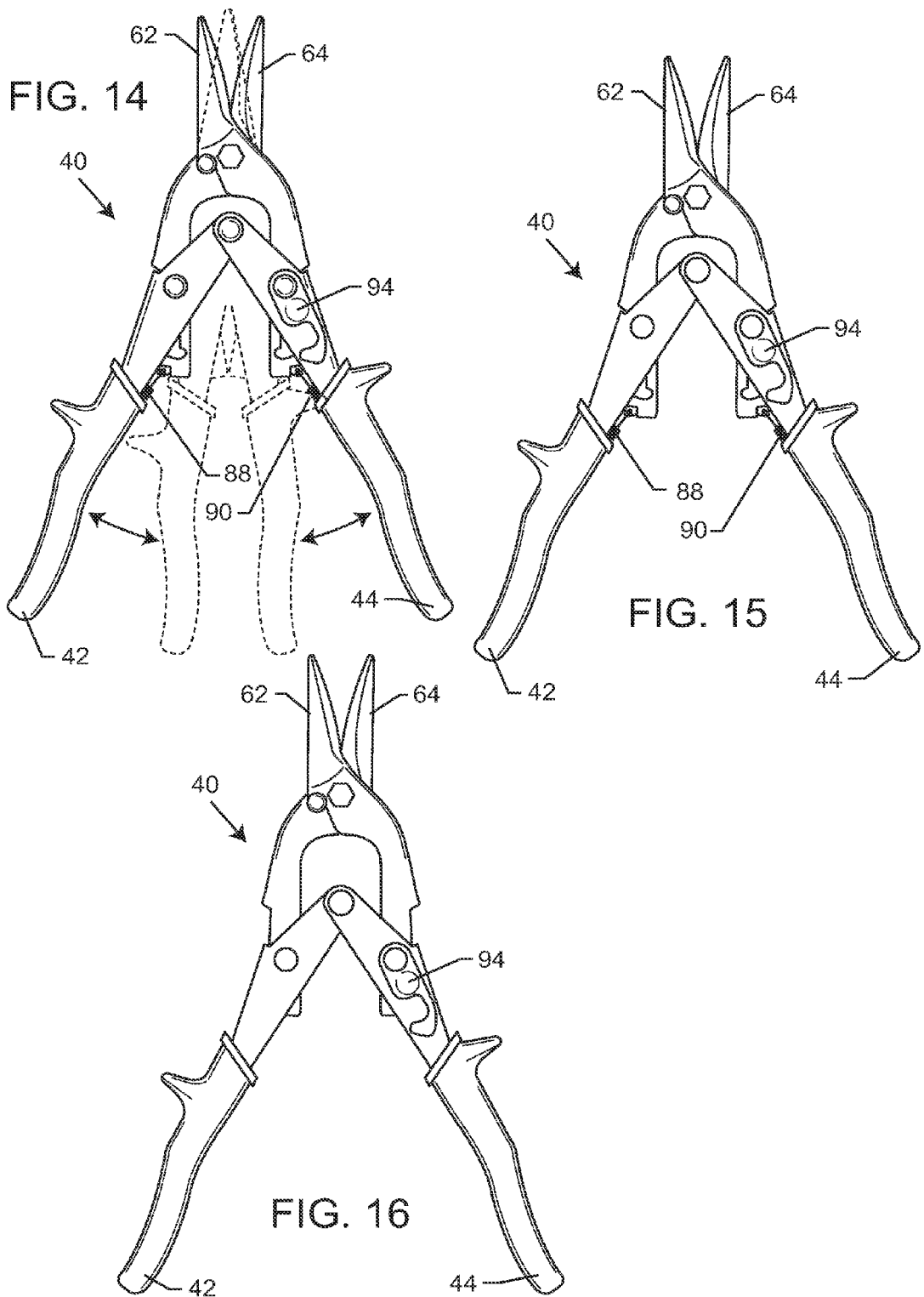

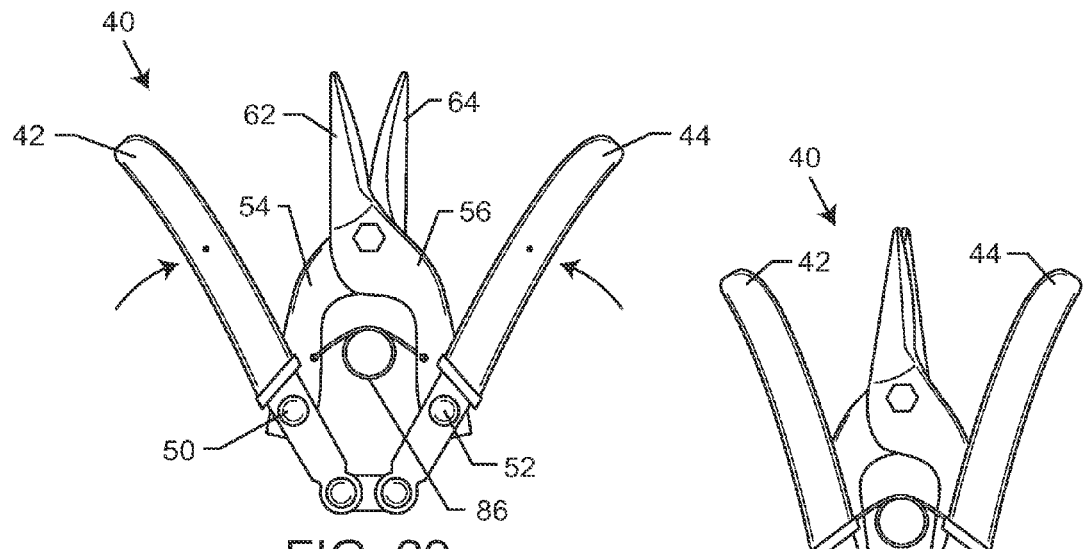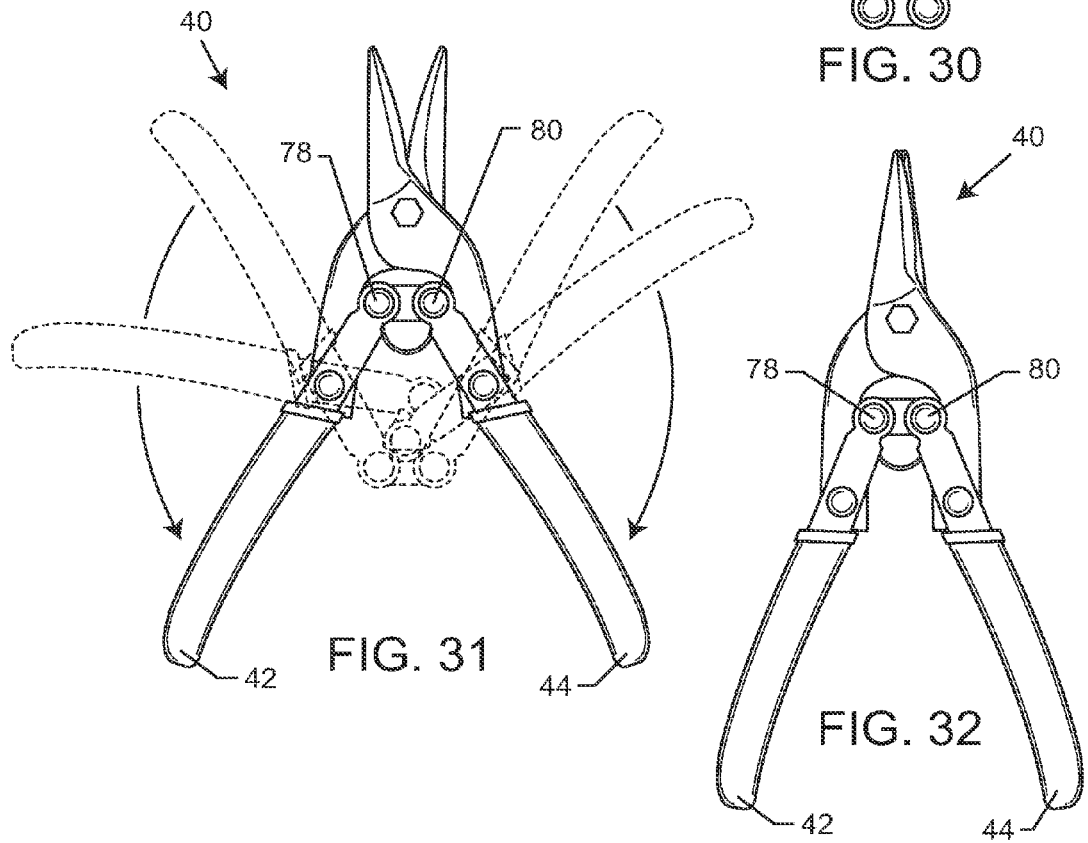

TWO STAGE FORCE MULTIPLIER TIN SNIPS

RELATED APPLICATION

This application is a continuation-in-part of U.S. application Ser. No. 11/937,113 filed Nov. 8, 2007 (now U.S. Pat. No. 8,739,415), which claims the benefit of U.S. Provisional Application Ser. No. 60/865,612, filed Nov. 13, 2006.

BACKGROUND OF THE INVENTION

The present disclosure relates to tin snips. More particularly, the invention relates to tin snips having a two-stage force multiplier capable of changing the mechanical advantage.

Snips or shears are among the most commonly used hand tools in industries ranging from sheet metal formation to gardening. Conventional snips or shears generally comprise an upper and lower cutting blade, each having elongated handles extending therefrom and attached thereto. The cutting blades are configured to pivot around a single axis point that separates the cutting blades from the handles. The cutting motion is activated by applying a constant force to the exterior of the handles. This exterior force effectively closes the handles. Correspondingly, the cutting blades close around the single axis point and engage an object to be cut at a variable point along the edges of the cutting blades. The force generated at the point of contact between the material being cut and cutting blades is essentially constant throughout the cutting stroke as the cutting blades are configured to pivot around the single axis point.

Mechanical advantage, or the factor by which the force output (i.e. force exerted at the point of contact between the cutting blade and material) is measured relative to the force input (i.e. force exerted on the handles), is largely important when considering that tin snips and cutting shears have a large range of applications. Accordingly, with a large range of applications comes an equally large range of cutting effort depending on the specific application. For example, cutting force varies in the sheet metal forming industry depending on the type of sheet metal, sheet metal thickness, and sheet metal material composition. When using snips as shrubbery shears, the thickness, durability, and variety of vegetation all determine the required cutting force.

For conventional snips or shears having a single point of rotation, the mechanical advantage consists of a relatively straight-forward computation. To illustrate the mechanical advantage of conventional snips or shears, consider the following unit-less calculation: torque (T)=force (F) distance (D). In conventional tin snips, an input force is applied to the handles of the tin snips via a user's hand and thereafter an output force is generated at the point of resistance—i.e. the contact point between the cutting blades and material being cut. The distance from the above-equation is measured from the input/output force points to the single axis point separating the handles and cutting blades. Respective torque equations for the handles and the cutting blades would equal: T (handles)=F (input)*D (input) and T (cutting blades)=F (output)*D (output). Accordingly, under the abovementioned principle, T (handles)=T (cutting blades). Thus: F (input)*D (input)=F (output)*D (output). While conventional snips or shears may widely vary in size and shape—consider for this example that the distance between the input force point on the handles and the single axis point is 5× longer than the distance between the output force at the point of cutting blade and material contact and the single axis point. Therefore: D (input)=5D (output). The equation is thus rearranged to solve for the output force: F (output)={[F (input)*5D (output)]/D (output)}. Therefore: F (output)=5F (input). Here, a user can exert an output force on an object to be cut that is 5× the input force. In this example, the mechanical advantage is largely generated by the difference in the distance D (input) of the handle relative to the distance D (output) of the cutting blades. Mechanical advantage is important because it enables users to exert higher cutting forces on objects, forces that may otherwise be unobtainable.

A person employing use of the conventional snips or shears having a single axis point, as in the above example, will require a variety of tools designed for each specific cutting assignment. Tools with longer handles will be employed for assignments requiring larger output force, while smaller tools having shorter handles will be employed for assignments requiring less output force. Even so, snips or shears intended to cut harder materials may require unacceptably large amounts of physical input force. Or, alternatively, operation of large tools may become overly cumbersome and inoperable due to the long and bulky handle size.

Thus, there exists a significant need for improved tin snips having increased, variable mechanical advantage. Such improved tin snips should include a two-stage compound mechanism having a sliding adjustment pivot point. The mechanical advantage of the tin snips increases by creating extra handle leverage when sliding the adjustment pivot point from a first compact position to a second extended position. Such improved tin snips may also include a mechanism for inverting the handles to provide a compact and mobile design. The present invention fulfills these needs and provides further related advantages.

SUMMARY OF THE INVENTION

The present invention is directed to two-stage force multiplier tin snips having a pair of cutting blades and associated tangs that are both pivotable about a cutting blade axis. Each respective tang is coupled to a pair of handles by a pair of respective tang pins. The handles are pivotably attached to one another about a handle axis. The two-stage force multiplier tin snips includes a means for changing a force multiplier for the cutting blades by selectively adjusting relative longitudinal positioning of the cutting blade axis, the handle axis or the tang pins, relative to another of the cutting blade axis, the handle axis or the tang pins.

In one embodiment, the tang pins are coupled to the tangs and slidably reside within a slot formed in each respective handle. Each slot includes a notch for releasibly retaining the respective tang pin in a retracted position. In this embodiment, the force multiplier is changed by releasing the tang pin from within the notch and thereafter sliding the tang pin to an opposite end of the slot. Accordingly, the tin snips move from a retracted position to an extended position. The tin snips further include a spring associated with each tang for biasing the tang pin toward engagement with the respective notch.

In another alternative embodiment, the tang pins are coupled to the handles and slidably reside within a slot formed in each respective tang. Each slot includes a notch for releasibly retaining the respective tang pin in a retracted position. In this embodiment, the force multiplier is changed by releasing the tang pin from within the notch and thereafter sliding the tang pin to an opposite end of the slot. Accordingly, the tin snips move from a retracted position to an extended position. The tin snips may also further include a spring associated with each tang pin for biasing the handles toward engagement with the respective notch.

Alternatively, the longitudinal location of the cutting blade axis or the handle axis may be changeable to adjust the mechanical advantage. In one embodiment, the cutting blade axis slidingly resides within a slot formed intermediate the cutting blades and the tangs. Sliding the cutting blade axis from a first position relatively closer to the tangs to a second position relatively closer to the cutting blades, effectively increases the force multiplier. Alternatively, the handle axis slidingly resides within a slot formed in each respective handle. Sliding the handle axis from a first position relatively closer to the handle ends to a second position relatively closer to the cutting blades, also effectively increases the mechanical advantage.

The sliding of the handle axis from a first position to a second position may comprise means for changing a force multiplier for the cutting blades by selectively adjusting the handle axis between an upper position proximate to the cutting blade axis and a lower position distal from the cutting blade axis. The handle axis preferably comprises an axis pin slidably disposed in overlapping slots on each of the pair of handles. The elongated slots are preferably oriented longitudinally relative to the tin snips, having a first end proximate to the cutting blade axis and a second end distal from the cutting blade axis. The upper position of the handle axis corresponds to the axis pin being disposed in the first end of the elongated slots and the lower position of the handle axis corresponds to the axis pin being disposed in the second end of the elongated slots. The slots may preferably comprise a means for retaining the axis pin in one of the first or second ends of the elongated slots. These means for retaining may include biasing springs, friction, snap-fit, press-fit.

In an alternate embodiment, one of the pair of handles may comprise an upper fixed pin and a lower fixed pin and the other of the pair of handles may comprise laterally disposed upper and lower elongated slots. Each of the upper and lower slots is configured to receive the corresponding upper or lower fixed pin. A selection lever pivotally attached to one of the pair of handles has a securing notch configured to selectively engage the lower fixed pin. The lower position of the handle axis corresponds to the lower fixed pin when the same is engaged with the securing notch on the selection lever. The upper position of the handle axis corresponds to the upper fixed pin when the lower fixed pin is disengaged from the securing notch on the selection lever. The upper fixed pin is disposed in a functional end of the upper slot when the handle axis is in the upper position. The lower fixed pin is disposed in a function end of the lower slot when the handle axis is in the lower position.

In another embodiment, the handles of the tin snips may invert to a compact position. In this embodiment, the tin snips include a spring tensioned between the tangs for biasing the tin snips in an open position. Handle inversion may be facilitated by a pair of handle axes interconnected by a coupler or by means of the pins as slidingly engaged to corresponding angular slots formed in the respective handles. The handle axes or angular slots provide the necessary rotational movement such that the handles are capable of rotating to an inverted position relative to the tangs and cutting blades.

In still yet another embodiment, the tin snips of the present invention may include a side cutter. The side cutter may be a traditional compound leverage side cutter integral to tin snips having a fixed pin arrangement. Or, the side cutter may be integrated into tin snips having handles that slide relative to the tangs and corresponding cutting blades, according to the embodiments described above. When the tin snips are in an extended position, the side cutter is in an initial engaged position. Here, a blade on the side cutter is exposed from a handle housing and is ready for cutting. The side cutter is moved to a disengaged position when the handles and corresponding tangs move from the initial extended position to a subsequent compact position. Here, the side cutter is in a disengaged position such that the blade is retracted within the handle housing. Furthermore, the tin snips of the present invention may include a selectively engageable lock that secures the tin snips in a closed position against a means for biasing the tin snips in an open configuration.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a top view of the tin snips of the present invention in a closed compact position;

FIG. 2 is a top view of the tin snips of FIG. 1, in an open compact position;

FIG. 3 is a top view of the tin snips of FIG. 1, illustrating movement from the initial compact position to a subsequent extended position;

FIG. 4 is an alternative top view of the tin snips of FIG. 2, having only an upper receiver notch;

FIG. 7 is a top view of the tin snips of FIG. 1, in an open extended position;

FIG. 8 is a bottom view of tin snips embodying the invention and having telescoping handles;

FIG. 10 is a top view of an alternative embodiment tin snips embodying the invention, having slots extending through the handles and the blade tangs;

FIG. 11 is a top view of another alternative embodiment of tin snips having intermediate the cutting blades and blade tangs;

FIG. 14 is a bottom view of the tin snips having a pair of springs, illustrating movement of the handles and cutting blades from an initial closed compact position to a subsequent open compact position;

FIG. 15 is a bottom view of the tin snips of FIG. 14, in the open compact position;

FIG. 16 is a bottom view of the tin snips of FIG. 14, in an open extended position;

FIG. 29 is another alternate embodiment of the tin snips, incorporating a coil spring and dual handle pivot points;

FIG. 30 is a top view of the tin snips of FIG. 29, in a closed position;

FIG. 31 is a top view of the tin snips of FIG. 29, illustrating movement of the handles from an inversed position to a standard position;

FIG. 32 is a top view of the tin snips of FIG. 29, in a closed standard position;

DETAILED DESCRIPTION OF THE PREFERRED EMBODIMENTS

Figure 5:
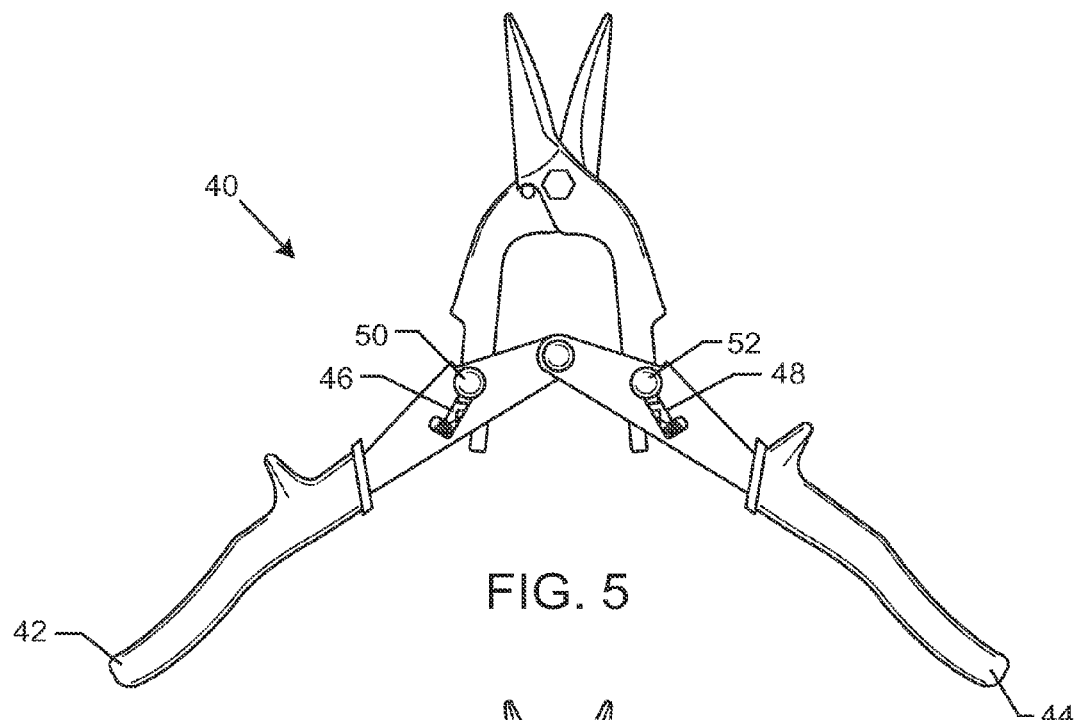
FIG. 5 is a top view of the tin snips of FIG. 1, in a disengaged extended position.

As shown in the exemplary drawings for purposes of illustration, the present disclosure for tin snips is referred to generally by the reference numeral 40. Turning now to the representative figures in the specification, FIG. 1 illustrates the tin snips 40 having a set of pivotably connected handles 42, 44, each having a slot 46, 48 formed therein. The slots 46, 48 are each adapted to receive a pair of pins 50, 52 which are secured to a pair of blade tangs 54, 56. The handles 42, 44 move relative to one another about a common handle axis point 58. The pair of blade tangs 54, 56 are correspondingly configured to pivot about a base axis point 60 that separates the blade tangs 54, 56 from a pair of cutting blades 62, 64 (shown best in FIG. 2). The cutting blades 62, 64 are shown in FIG. 1 in closed form. In this embodiment, the slots 46, 48 are formed in the handles 42, 44 and are configured to have the tin snips 40 operate in a compact position, as shown in FIG. 1, or an extended position as generally shown in FIG. 7. To retain the tin snips 40 in either the compact or extended positions, the slots 46, 48 each have an upper receiver notch 66, 68 (FIGS. 2-3) and a lower receiver notch 70, 72 (FIGS. 3, 7).

As shown in FIGS. 1 and 2, the pins 50, 52 are engaged in the lower receiver notches 70, 72. The pins 50, 52 further engage the lower receiver notches 70, 72 when the cutting blades 62, 64 of the tin snips 40 are opened. When the tin snips 40 are in the open compact position as illustrated in FIG. 2, both the cutting blades 62, 64 and the handles 42, 44 open for the purpose of cutting. The cutting motion is generated by an input force on the handles 42, 44 along the arrows illustrated in FIG. 2. Applying this force along the handles 42, 44, toward the interior of the tin snips 40, effectively closes the cutting blades 62, 64 upon a material contact point 74. The material contact point 74 changes as the cutting blades 62, 64 close and cut the material.

When the tin snips 40 move from an open compact position (FIG. 2) to a closed compact position (FIG. 1), the handles 42, 44 and the blades 62, 64 close. Applying a force along the arrows in FIG. 2 closes the handles 42, 44 by pivoting them about the handle axis point 58. In turn, a force is exerted on the lower receiver notches 70, 72 (not shown in FIG. 2) and transferred to the pins 50, 52. The pins 50, 52, which are connected to the blade tangs 54, 56, also move to a position substantially closer to one another as the handles 42, 44 close. The movement of the pins 50, 52 forces the blade tangs 54, 56 to rotate inwardly. Accordingly, with the movement of the blade tangs 54, 56, the cutting blades 62, 64 rotate shut about the base axis point 60. During the closing of the cutting blades 62, 64, an output force is exerted at the material contact point 74.

Figure 6:
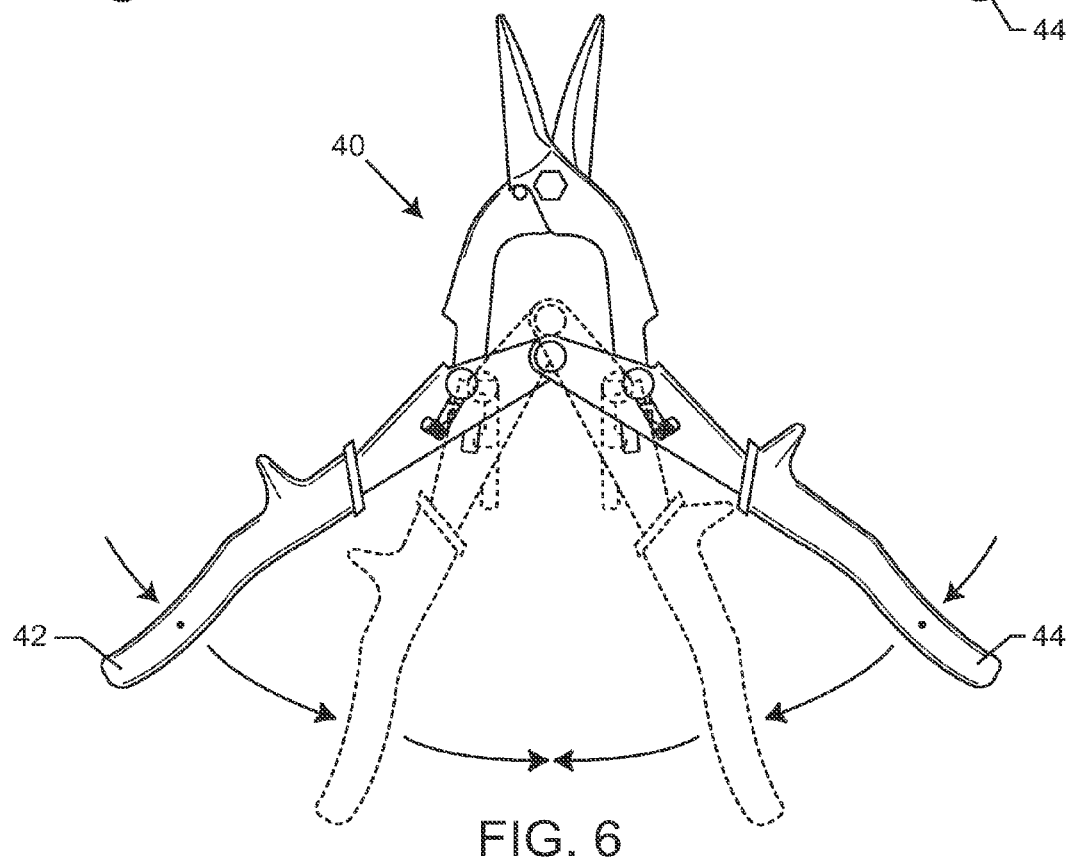
FIG. 6 is another top view of the tin snips similar to FIG. 5, illustrating movement from the disengaged extended position to an engaged extended position.

The tin snips 40 also include a second, extended position, wherein the mechanical advantage of the force exerted at the material contact point 74 is increased. FIG. 3 illustrates the movement of the handles 42, 44 from the compact position shown in FIGS. 1 and 2 to an extended position as shown in FIG. 7. The pins 50, 52 located on the blade tangs 54, 56 are removed from the lower receiver notches 70, 72 by exerting an outward force on the interior of the handles 42, 44 along the interior directional arrows as shown in FIG. 3. As the handles 42, 44 extend in a direction along the arrows in FIG. 3, the pins 50, 52 disengage from the lower receiver notches 70, 72. As the handles 42, 44 continue to travel outwardly, the pins 50, 52 travel through an intermediary section of the slots 46, 48 to the upper receiver notches 66, 68 (FIG. 5). Upon engagement of the pins 50, 52 into the upper receiver notches 66, 68, the tin snips 40 are returned to an operating position by exerting an external force on the handles 42, 44 as shown in FIG. 6. FIG. 7 illustrates the tin snips 40 in an open extended position and ready for cutting. Notice the increased distance between the handle axis point 58 and the base axis point 60 in FIG. 7 relative to FIG. 2. As is further herein disclosed, increasing the distance between the handle axis point 58 and the base axis point 60 effectively increases the mechanical advantage of the tin snips 40.

In an alternate embodiment, the tin snips 40 may include the alternative slots 46, 48 as shown in FIG. 4. The lower receiver notches 70, 72 are not necessarily required. The tin snips 40 can operate in the compact position as shown in FIGS. 1 and 2 without requiring engagement with the lower receiver notches 70, 72. Furthermore, the slots 46, 48 could include multiple receiver notches along the slots 46, 48 to provide more than two operating positions. The inclusion of more notches along the slots 46, 48 would provide multiple configurations of the tin snips 40, having various lengths and mechanical advantages.

The increased mechanical advantage of the tin snips 40 of FIGS. 1-7 can also be created via a two-stage composite mechanism wherein the handle axis point 58 slidably adjusts from the compact position (FIG. 2) to an extended position (FIG. 7). When the distance between the handle axis point 58 and the base axis point 60 is extended, the mechanical advantage of the tin snips 40 is increased. Thus, sliding the handle axis point 58 from a compact position in FIG. 2 to the extended position FIG. 7 is comparable to extending the handles 42, 44 to create extra leverage for increased torque.

The kinematic model of the tin snips 40 includes a two-stage force multiplier. The first multiplier stage is created by the interaction of the handles 42, 44, which rotate about the handle axis point 58, with the blade tangs 54, 56 via the connection pins 50, 52. The second multiplier stage is created by the interaction between the blade tangs 54, 56 and the cutting blades 62, 64, which both rotate about the base axis point 60. Referring to FIG. 2, the arrows pointing toward the handles 42, 44 represent the input force location on an external portion of the handles 42, 44 thereof. The handle axis point 58 represents the pivot point between the handles 42, 44. The pins 50, 52 are the force input points from the handles 42, 44 to the blade tangs 54, 56 via the slots 46, 48 in the handles 42, 44. As shown in FIG. 2, the base axis point 60 represents the pivot point between the blade tangs 54, 56 and the cutting blades 62, 64. The material contact point 74 represents the point where the output force from the cutting blades 62, 64 is exerted on a work piece. It is preferred that the handles 42, 44, the slots 46, 48, the pins 50, 52, the blade tangs 54, 56, the handle axis point 58, the base axis point 60, and the material contact point 74 are symmetric with respect to a centerline 76 of the tin snips 40 in FIG. 2.

Alternatively, the tin snips 40 may be configured wherein any of the points representing the input force on the handles 42, 44 and/or the placement of the pins 50, 52 are asymmetric relative to the centerline 76 of the tin snips 40. Additionally, the handle axis point 58, the base axis point 60, or the material contact point 74 may lie either to the left side or to the right side of the centerline 76 in FIG. 2.

The force multipliers that create the mechanical advantage of the tin snips 40 are calculated in two stages. The first stage starts with the magnitude of the input force on the handles 42, 44 along the arrows in FIG. 2. Recall that the force exerted on the handles 42, 44 is transferred via the slots 46, 48 to the pins 50, 52 and thereafter to the blade tangs 54, 56. The force exerted on the pins 50, 52 is calculated by multiplying the input force on the handles 42, 44 by the ratio of two distances. The first distance is the length between the input force of the handles 42, 44 to the handle axis point 58 as represented by length A in FIG. 7. The second distance is the length between the handle axis point 58 and the pins 50, 52 as represented by length B also in FIG. 7. The corresponding force exerted on the pins 50, 52 is the input force exerted on the handles 42, 44 multiplied by the ratio of the distances A/B. The resulting force of the above equation is utilized as the input force at the pins 50, 52 to compute the second stage of the two-stage force multiplier tin snips.

The second stage of the two-stage force multiplier tin snips is calculated similar to the first stage. The input force at the pins 50, 52, as calculated above, is similarly multiplied by a length ratio to obtain the output force at the material contact point 74. The first distance is the length between the pins 50, 52 and the base axis point 60 as represented by letter C in FIG. 7. The second distance is the length between the base axis point 60 and the material contact point 74 as represented by D also in FIG. 7. The output force exerted at the material contact point 74 is therefore calculated by multiplying the input force at the pins 50, 52 by the distance ratio C/D.

The first stage and the second stage force multipliers are then combined in order to calculate the output force exerted at the material contact point 74 relative to the input force on the handles 42, 44 with respect to the distances A, B, C, and D. The ratio between the input force exerted on the handles 42, 44 and the output force exerted at the material contact point 74 is appropriately the mechanical advantage of the tin snips 40 of these embodiments. Thus, the force multiplier or mechanical advantage of the embodiments disclosed in FIGS. 1-7 is the force input multiplied by the ratio of (A*C)/(B*D). The mechanical advantage can be increased by increasing either length A or length C; or by decreasing B or length D. The concept behind this force multiplier was shown in the preceding illustrations as a preferred embodiment. A person of ordinary skill in the art will readily recognize that adjustment of the force multiplier may be obtained by adjusting any of the points, including the input force point on the handles 42, 44, the location of the pins 50, 52, the location of the handle axis point 58, the location of the base axis point 60, or the location of the material contact point 74. Additionally, any of the preceding points may be removed depending upon the requisite force multiplier configuration in order to achieve the desired mechanical advantage. Moreover, as previously indicated, any of the preceding points may also be aligned asymmetric to the centerline 76 (FIG. 2) of the tin snips 40 of the present disclosure. The calculation of the mechanical advantage in the two-stage compound mechanism having asymmetric symmetry still only relies on the relative distances as described in the preceding paragraph.

The adjustable movements illustrated thus far are movements only in the vertical direction. Vertical movement of the tin snips 40 is preferred because it maintains the material contact point 74 in a substantially constant location. It is this "route" cut point of the cutting blades 62, 64 that is maintained (i.e. the points where the cutting blade 62 crosses the cutting blade 64). But, it is also possible to adjust any of the distances A-D (FIG. 7) in directions that are not entirely vertical, but have, for example, a horizontal component. The calculation of the mechanical advantage still relies on the relative distances between all or some of the points previously described.

In the embodiments shown thus far, all of the illustrations have used straight slots 46, 48 between two optional notches, the upper receiver notches 66, 68 and the lower receiver notches 70, 72. As is illustrated in FIG. 3, the tin snips 40 have at least two notches to receive the pins 50, 52 in the slots 46, 48 of the handles 42, 44. FIG. 3 illustrates stop points only at the upper receiver notches 66, 68 and the lower receiver notches 70, 72. Alternatively, the slots 46, 48 may be configured for indexing. For example, the slots 46, 48 may include additional notches that are intermittently located along the length of the slots 46, 48. Additional notches, single or multiple, provide better adjustability and a wider range of adjustable mechanical advantages. Additionally, the slots 46, 48 may have other configurations that are not straight. For example, FIGS. 33-36 illustrate an alternative embodiment wherein the slots 46, 48 are curved. The slots 46, 48 may also be jagged or shaped in another configuration depending on the desired slot configuration and mechanical advantage. It is also possible that the tin snips 40 do not have any slots. For example, the tin snips 40 may incorporate relocatable pins that are removed and replaced through a hole with a different position (not shown). Moreover, it is also possible that the tin snips 40 do not use pins 50, 52 at all. Rather, the tin snips 40 may have protrusions on one of the mating parts in recesses of the other mating part that interact in approximate rotation that a pin would normally have accomplished. The mating protrusion could be adjustable by landing the protrusions in repeated recesses in close proximity to one another, like a pawl tooth jumping from one position to the next on a rack gear.

In the embodiments disclosed thus far, the handle axis point 58 and the base axis point 60 have been stationary, rotatable points that lie on the centerline 76 of the tin snips 40 (FIG. 2). The handle axis point 58 and the base axis point 60 can also be separated so that multiple points exist. For example, in FIG. 32, the handle axis point 58 can be replaced with a pair of handle axis points 78, 80. In a similar manner, the base axis point 60 may also be separated into two or more axis points (not shown). In each of the preceding examples, the axis points each react against a common support member that join either of the two points together. A person of ordinary skill in the art will recognize that the tin snips 40 as herein disclosed can embody any set of configurations such that distances between any of the axis points may be varied to increase or decrease the mechanical advantage of the input force relative to the output force.

Figure 9:
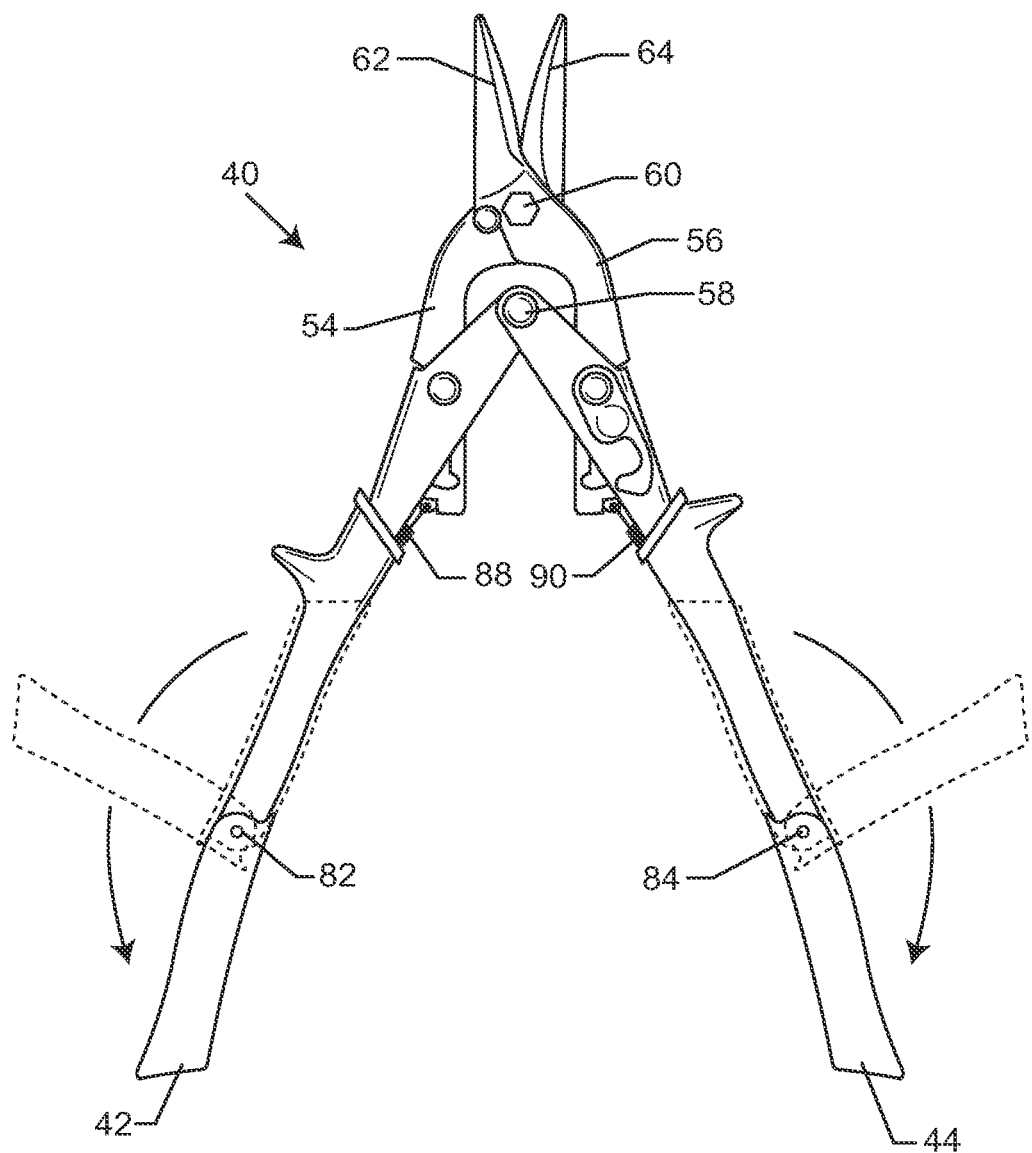
FIG. 9 is a bottom view of tin snips having hinged handles.

FIGS. 8 and 9 show an alternative embodiment of the tin snips 40 having extendable handles 42, 44. In FIG. 8, the handles 42, 44 include a telescoping feature wherein the handle length may be extended. FIG. 8 generally illustrates the telescoping feature of the handles 42, 44 in that the standard position of the tin snips 40 is shown in phantom relative to the subsequent, extended position. The force multiplier is effectively increased because the distance between the input force on the handles 42, 44 and the handle axis point 58 is lengthened. As previously described, lengthening this distance (distance A in FIG. 7) increases the mechanical advantage.

A "short snip" design embodying the tin snips 40 uses shorter handles than a traditional tin snip, to provide better compactness and mobility. The telescoping feature as disclosed in FIG. 8 enables the "short snip" design to obtain output forces at the material contact point 74 similar to those output forces of traditional sized tin snips. FIG. 9 further discloses another embodiment for adjusting the force multiplier via the length of the handles 42, 44. In this embodiment the handles 42, 44 are in a hinged configuration. The handles 42, 44 are initially embedded within the housing of the standard length handles, as shown in phantom, and are extendable by rotating the embedded portion of the handles 42, 44 outwardly around the handle pivot points 82, 84. Similar to the concept in FIG. 8, by increasing the distance between where the input force is applied to the handles 42, 44 and the handle axis point 58, the force multiplier is effectively increased.

Furthermore, FIGS. 8 and 9 disclose a bottom view of the tin snips 40 of the present disclosure. A coil spring 86 (shown best in FIG. 29) tensions the blade tangs 54, 56 in an open position, regardless whether the tin snips 40 are in the compact position (FIG. 2) or the extended position (FIG. 7). In this manner the coil spring 86 travels with the movement of the handles 42, 44. By tensioning the blade tangs 54, 56 in a substantially open position, the cutting blades 62, 64 also remain substantially in an open position because the cutting blades 62, 64 pivot with respect to the blade tangs 54, 56 around the base axis point 60. As further shown in FIGS. 8 and 9, a pair of handle springs 88, 90 function to retain the handles 42, 44 in an operable position when the tin snips 40 are moved from a compact position to an extended position, and vice versa. The process of switching the tin snips 40 from a compact position to an extended position is generally shown through the sequence of steps starting with FIG. 2 and ending with FIG. 7. When the handles 42, 44 are moved substantially outwardly as generally depicted in FIG. 3 and FIG. 5, the handle springs 88, 90 exert an inward force along the connection between the blade tangs 54, 56 and the handles 42, 44 (shown best in FIGS. 8 and 9). The handle springs 88, 90 provide the force required to return the handles 42, 44 (FIG. 5) to an operable position (FIG. 7). Additionally, the handle springs 88, 90 further facilitate engagement of the pins 50, 52 within the upper receiver notches 66, 68. Subsequently, upon disengagement of the pins 50, 52 from the upper receiver notches 66, 68, the handle springs 88, 90 are utilized to pull the pins 50, 52 through the slots 46, 48 to the lower receiver notches 70, 72.

In another alternative embodiment as shown in FIGS. 10 and 11, the slots 46, 48 can be extended through the handles 42, 44 and through the blade tangs 54, 56 (FIG. 10). In the embodiment in FIG. 10, the cutting blades 62, 64 do not move relative to the handles 42, 44. The pins 50, 52 slide in the slots 46, 48 relative to the handles 42, 44, the handle axis point 58, the base axis point 60, and the material contact point 74. Therefore, the force multiplier is adjusted by changing the distance of the pins 50, 52 relative to the aforementioned locations. In this embodiment, both stages of the two-stage multiplier are affected by the movement of the pins 50, 52. The two-stage force multiplier tin snips 40 gains multiplier along stage one, i.e. when the ratio of A/B is increased (by decreasing length B), while losing multiplier along stage two, i.e. when the ratio of C/D is decreased (by decreasing length C), as applicable to FIGS. 17-20 via the distances A, B, C, and D illustrated in FIG. 7. It is conceived that both multiplier changes may not offset one another equally. Thus, a net change of the force multiplier is still possible within this embodiment and can result in either an increase in mechanical advantage or a decrease in mechanical advantage, depending on the relative distances of A, B, C, and D with respect to one another.

FIG. 11 further discloses an alternate embodiment of FIG. 10. In this embodiment, the handles 42, 44 and the blade tangs 54, 56 are only able to rotate relative to one another about the pins 50, 52. Here, the base axis point 60 is slidable within the base slot 92, to adjust the force multiplier. In this embodiment, the force multiplier is affected by the distance between the base axis point 60 and the material contact point 74 (length D in FIG. 7) and the distance between the base axis point 60 and the pins 50, 52 (length C in FIG. 7).

Figure 12:
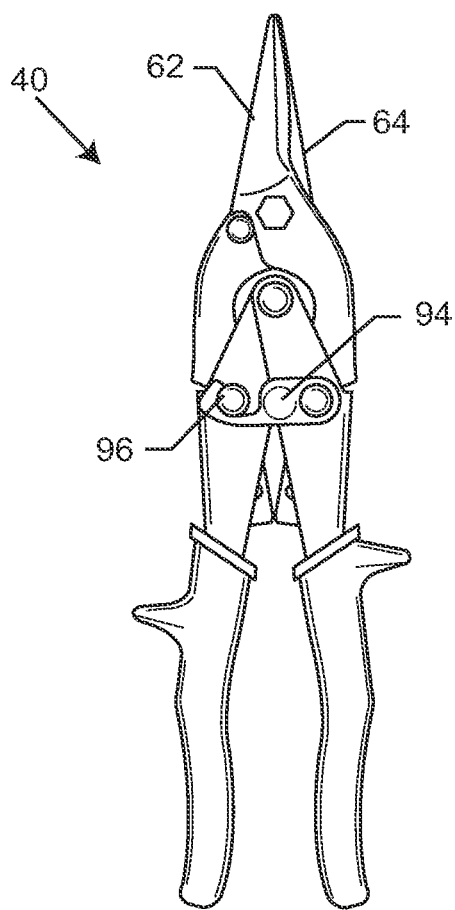
FIG. 12 is a top view of inventive tin snips having a lock.
Figure 13:
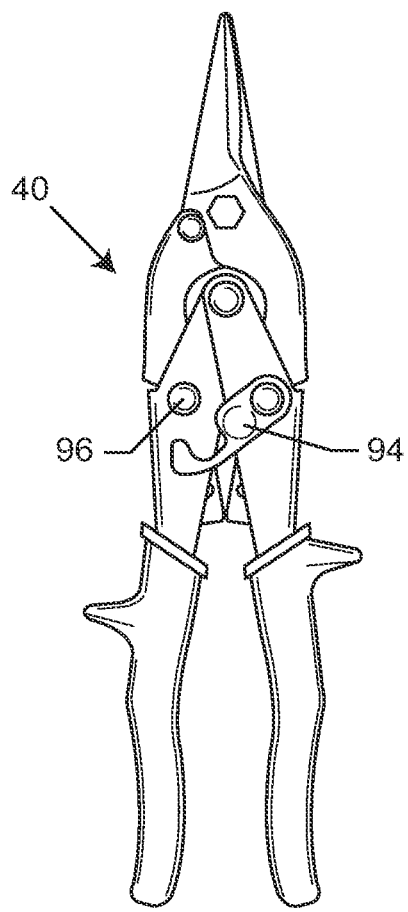
FIG. 13 is a top view of the tin snips of FIG. 12, in an unlocked, closed compact position.
Figure 17:
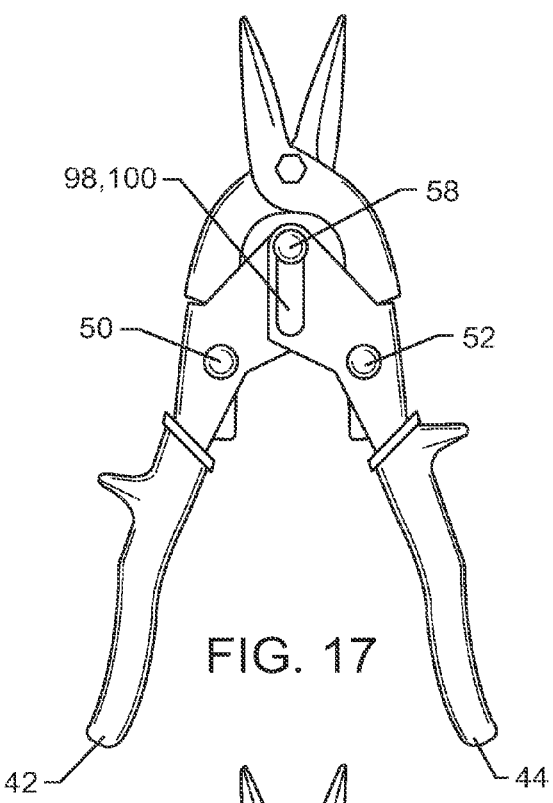
FIG. 17 is a top view of alternative tin snips allowing sliding adjustment of the handle axis, in an open compact position.
Figure 18:
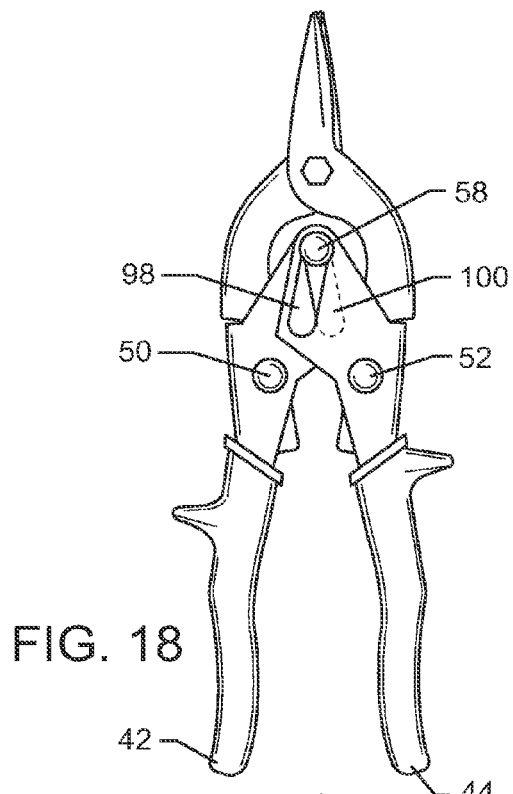
FIG. 18 is a top view of the tin snips illustrated in FIG. 17, in a closed compact position.

FIGS. 12-16 illustrate a locking mechanism 94 as used in conjunction with the handle springs 88, 90. In FIG. 12, the locking mechanism 94 engages a locking pin 96 as shown. Once the locking mechanism 94 disengages the locking pin 96 (FIG. 13), the handle springs 88, 90 force the handles 42, 44 to an open position as illustrated in FIGS. 14-16. The locking mechanism 94 is typically used to store the tin snips 40. When the locking mechanism 94 is engaged to the locking pin 96, as shown in FIG. 12, the razor edges of the cutting blades 62, 64 are not exposed. Thus, the locking mechanism 94 is used as a safety mechanism to prevent injury during non-use of the tin snips 40.

Figure 19:
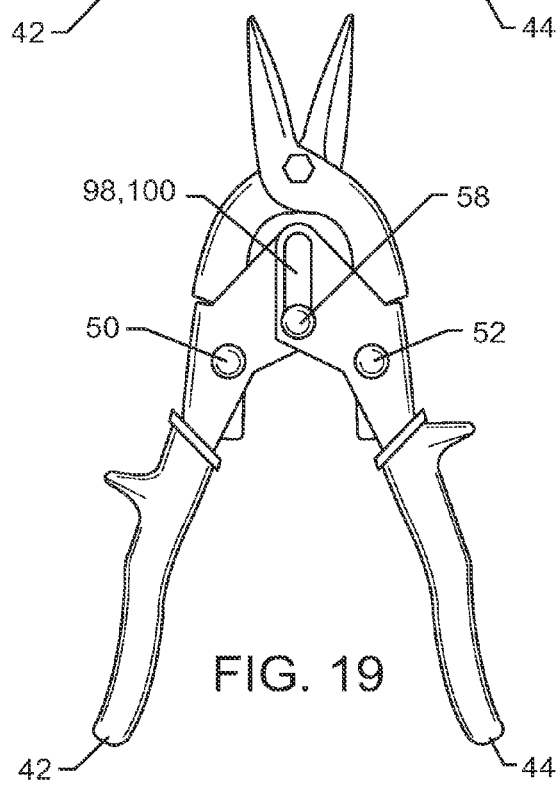
FIG. 19 is a top view of the tin snips illustrated in FIG. 17, in an open extended position.
Figure 20:
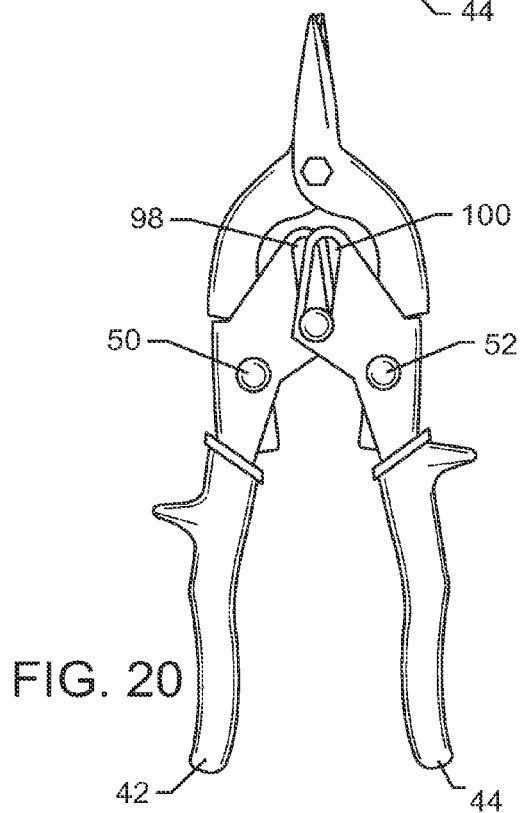
FIG. 20 is a top view of the tin snips illustrated in FIG. 17, in a closed extended position.

FIGS. 17-20 further disclose another alternative embodiment of the tin snips 40 disclosed herein. As best shown in FIG. 20, a set of dual handle slots 98, 100 replaces the slots 46, 48 shown in FIGS. 1-7. The adjustability of the mechanical advantage is illustrated by varying the location of the handle axis point 58 relative to the force input points on the handles 42, 44 and relative to the pins 50, 52. The mechanical advantage of the tin snips 40 increases when the handle axis point 58 moves from an initial position (FIG. 17) to a subsequent position (FIG. 19). The output force exerted at the material contact point 74 (not shown in FIGS. 17-20) changes through movement of the handle axis point 58. In this embodiment, only the first stage of the two-stage multiplier is affected. By moving the handle axis point 58 from an initial position (FIG. 17) to a subsequent position (FIG. 19), the first stage force multiplier is increased as the ratio of the distances A/B (shown in FIG. 7) is accordingly increased. The second stage of the two-stage multiplier is unaffected because the ratio of the distances C/D (FIG. 7) remains constant.

Figure 21:
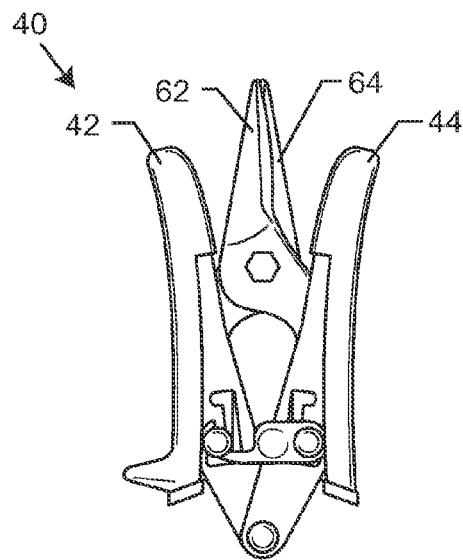
FIG. 21 is a top view of an alternative tin snips configuration having inversed handles, in a locked compact position.
Figure 22:
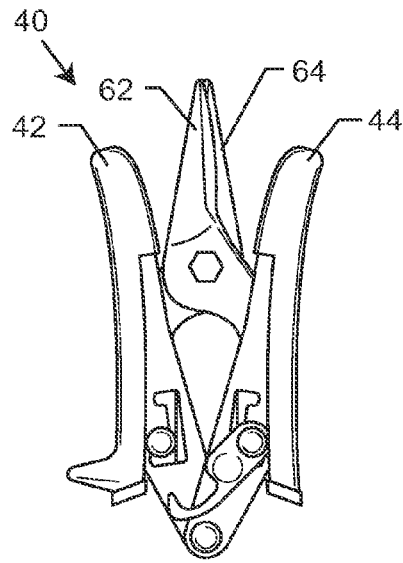
FIG. 22 is a top view of the tin snips illustrated in FIG. 21, in an unlocked compact position.
Figure 23:
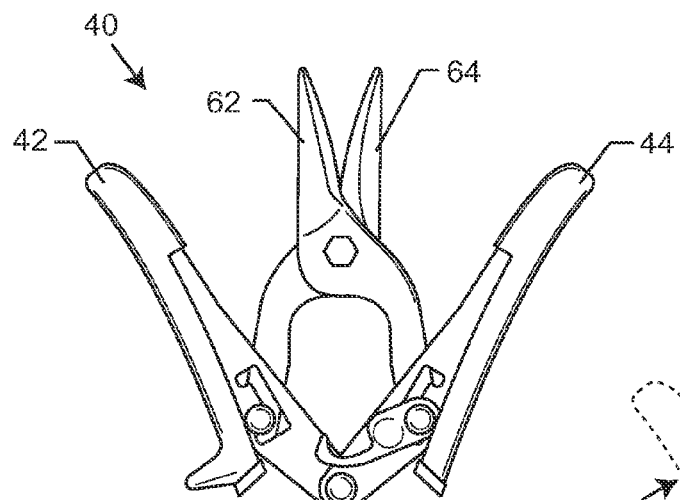
FIG. 23 is a top view of the tin snips illustrated in FIG. 21, in an open compact position.
Figure 24:
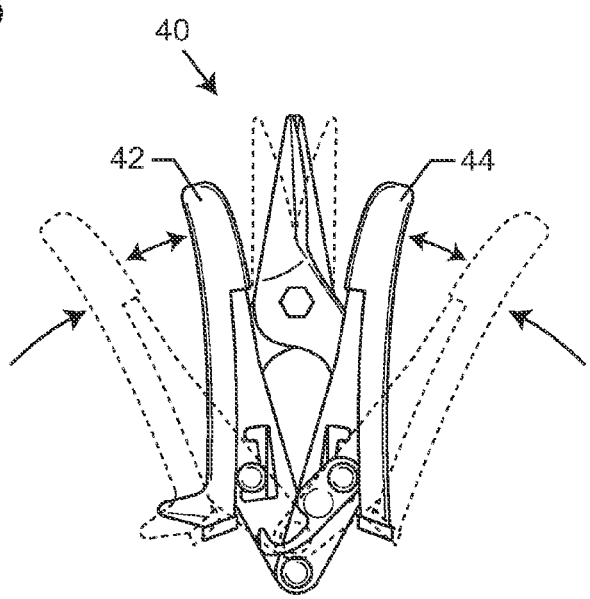
FIG. 24 is a top view of the tin snips illustrated in FIG. 21, illustrating movement from a closed compact position to the open compact position.

FIGS. 21-24 further illustrate another alternative embodiment wherein the handles 42, 44 of the tin snips 40 are in an inverted position. As shown in FIG. 21, the locking mechanism 94, as previously described, effectively retains the inverted handles 42, 44 in a closed position such that the cutting blades 62, 64 also remain closed. Disengaging the locking mechanism 94 as shown in FIG. 22 enables the coil spring 86 to force open the inverted handles 42, 44 and the cutting blades 62, 64 as illustrated in FIG. 23. The tin snips 40 are operated by moving the handles 42, 44 along the arrows illustrated in FIG. 24. As further shown in FIG. 24, the tin snips 40 operate between a closed position and an open position (in phantom). The tin snips 40 of FIGS. 21-24 are ideal for travel, outdoor use, or military use.

Figure 25:
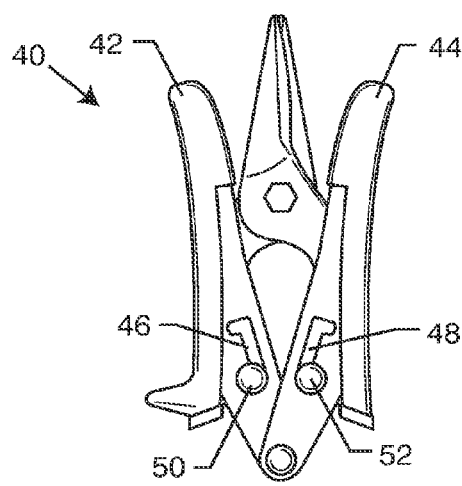
FIG. 25 is a top view of tin snips embodying the invention and having inversed handles, in a closed compact position.
Figure 26:
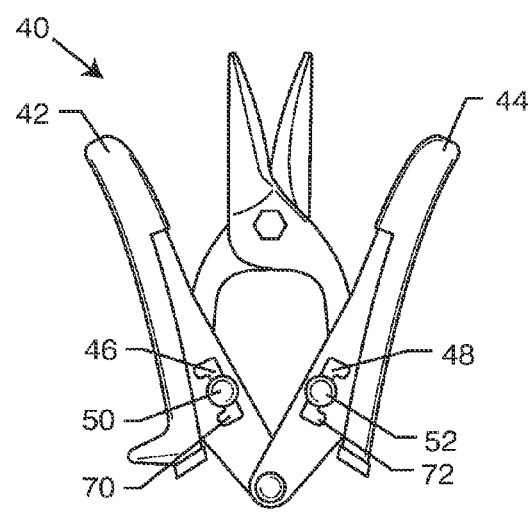
FIG. 26 is a top view of the tin snips of FIG. 25, illustrating a position intermediate the compact position and an extended position.
Figure 27:
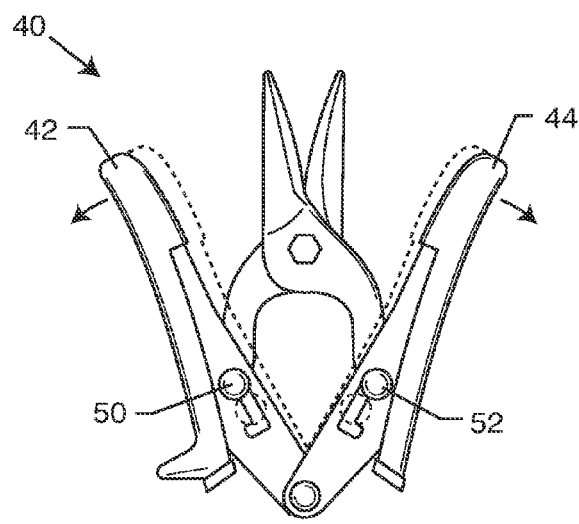
FIG. 27 is a top view of the tin snips of FIG. 25, illustrating engagement of the pins within the upper receiver notches.
Figure 28:
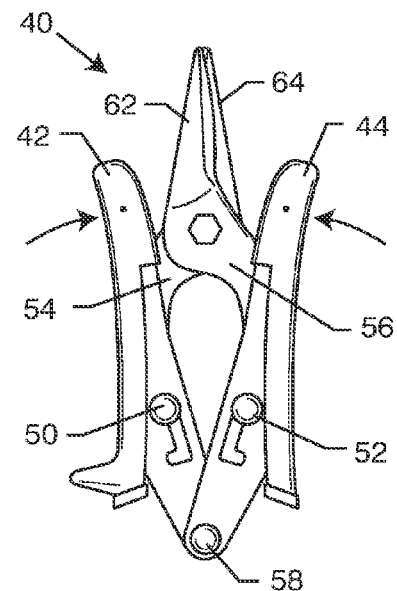
FIG. 28 is a top view of the tin snips of FIG. 25, in the compact extended position.
Figure 33:
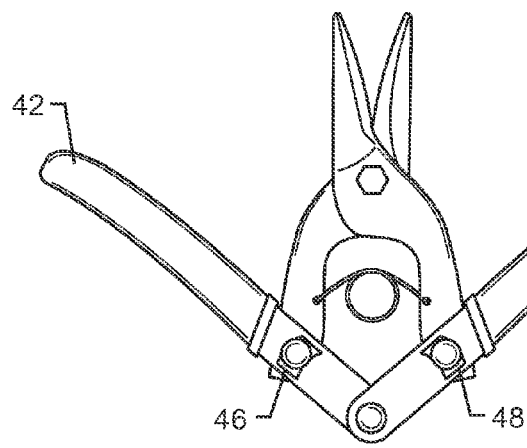
FIG. 33 is a top view of another alternate embodiment of the inventive tin snips, including arched slots incorporated into the handles.
Figure 34:
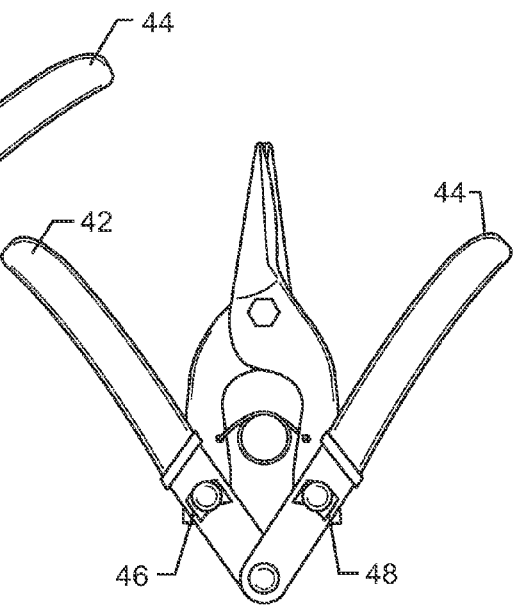
FIG. 34 is a top view of the tin snips of FIG. 32, in a closed inverse position.
Figure 35:
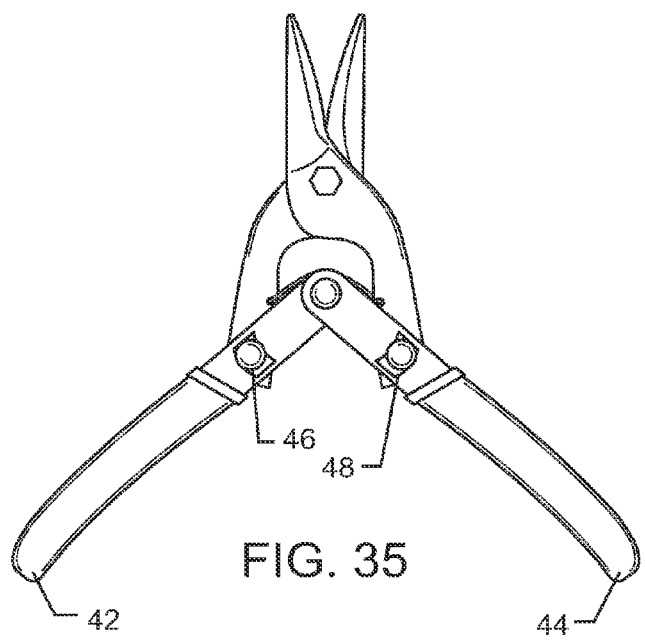
FIG. 35 is a top view of the tin snips of FIG. 32, illustrating handle rotation from the inverse position to a standard position.

FIGS. 25-28 illustrate the alternate tin snips 40 of FIGS. 21-24, having the inversed handles 42, 44, moving from a compact position to a subsequent extended position. The tin snips 40 in FIG. 25 are in the closed compact position as the pins 50, 52 are engaged in the lower receiver notches 70, 72 (not shown) of the slots 46, 48. By widening the handles 42, 44, as in FIG. 26, the pins 50, 52 disengage the lower receiver notches 70, 72 and enter the slots 46, 48. As shown in phantom in FIG. 27, the pins 50, 52 re-engage with the upper receiver notches 66, 68 (not shown). After engagement of the pins 50, 52 into the upper receiver notches 66, 68, the tin snips 40 may be closed as illustrated in FIG. 28. The tin snips 40 are closed by exerting a force along the arrows illustrated in FIG. 28 such that the handles 42, 44 rotate about the handle axis point 58. In turn, the pins 50, 52 move the blade tangs 54, 56, which then close the cutting blades 62, 64 about the base axis point 60. In this embodiment the mechanical advantage changes with respect to the distance between the input force on the handles 42, 44 and the pins 50, 52 and with respect to the distance between the pins 50, 52 and the handle axis point 58.

FIGS. 29-32 disclose the tin snips 40 capable of being operated in an inverted position (FIG. 29) or a standard position (FIG. 32). In FIG. 29, the handles 42, 44 of the tin snips 40 are in an inverse position relative to the blade tangs 54, 56 and the cutting blades 62, 64. The coil spring 86 tensions open the blade tangs 54, 56 and the handles 42, 44 as connected via the pins 50, 52. The tin snips 40 operate by applying pressure at the handles 42, 44 along arrows depicted in FIG. 29. FIG. 30 discloses the tin snips 40 having the inverse handles 42, 44 in a closed position. To invert the handles 42, 44 to a standard position as shown in FIG. 32, the handles 42, 44 are generally moved along the arrows illustrated in FIG. 31. The pair of handle axis points 78, 80 enable the handles 42, 44 to move in a disjointed manner as further depicted in phantom in FIG. 31. Such rotational movement about the pair of handle axis points 78, 80 enable the handles 42, 44 of FIGS. 29-32 to move from the inverted position in FIG. 29 to the standard position in FIG. 32. Once in the standard position the tin snips 40 are capable of operating in the manner as previously described.

Figure 36:
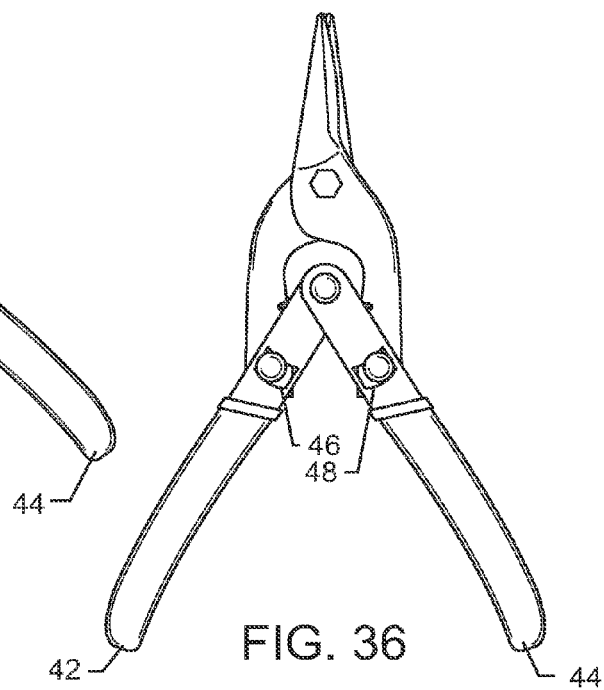
FIG. 36 is a top view of the tin snips of FIG. 32, in the closed standard position.
Figure 37:
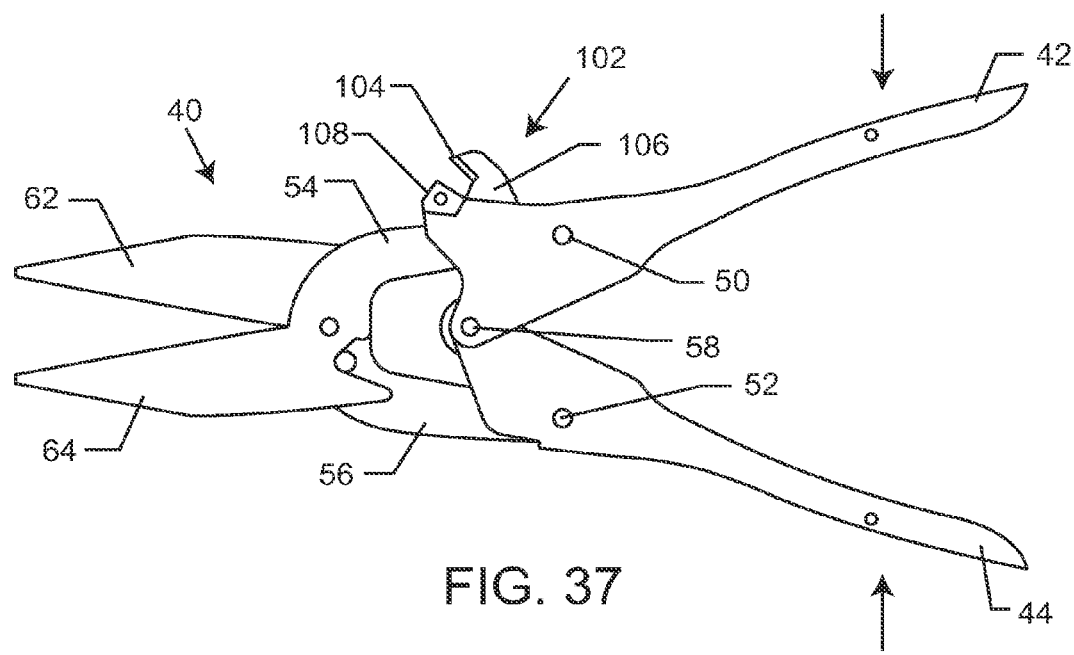
FIG. 37 is a top view of another alternative form of tin snips, further illustrating a side cutter.
Figure 38:
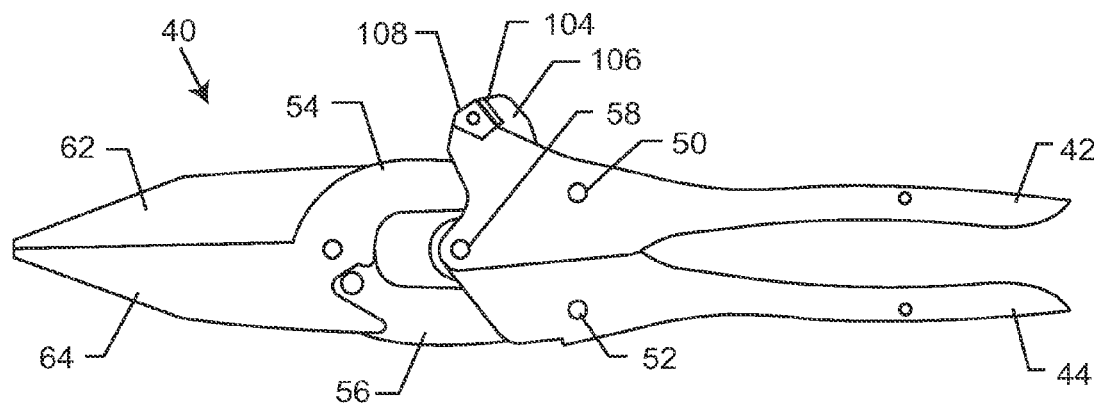
FIG. 38 is a top view of the tin snips of FIG. 37, in a closed position.

FIGS. 33-36 illustrate an alternate embodiment of the reversible tin snips 40 as disclosed in FIGS. 29-32. The tins snips 40 of FIGS. 33-36 include angled slots 46, 48 to facilitate movement of the handles 42, 44 from the inverse position (FIG. 33) to the standard position (FIG. 36). The angled slots 46, 48 as illustrated in FIGS. 33-36 largely do not have a two-stage mechanical advantage mechanism included therein. But, the angled slots 46, 48 of FIGS. 33-36 could be configured to include the multiple receiver notches of FIGS. 3 and 26 in order to obtain the reversible and two-stage multiplier characteristics as disclosed herein.

Figure 39:
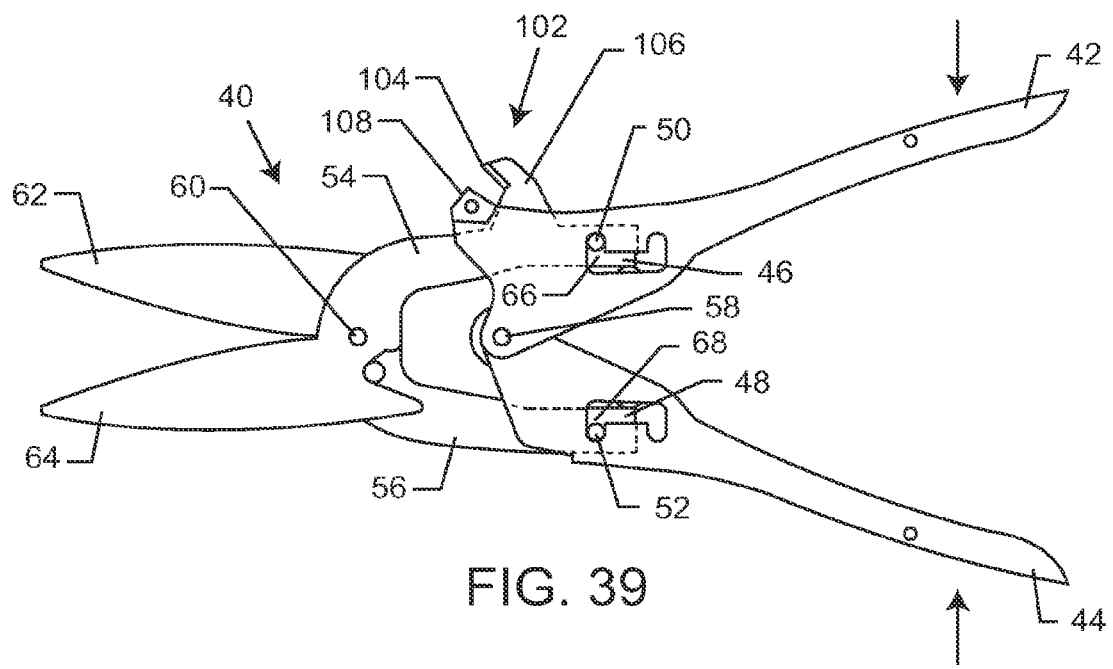
FIG. 39 is an alternative top view of the tin snips of FIG. 37, illustrating the side cutter integrated into tin snips having slidable handles.

FIGS. 37-44 illustrate yet another alternative embodiment of the tin snips 40 having a side cutter 102 integrated therein. The side cutter 102 includes a blade 104 affixed to a protrusion 106 formed as part of one of the blade tangs 54, 56. As best shown in FIG. 39, the protrusion 106 is formed as part of the blade tang 54. The blade 104 operates with a corresponding base end 108 of the corresponding handle 42. The blade 104 may contact the base end 108 to provide a traditional "compound leverage" fixed pin cutter. The cutting action is initiated by compressing the handles 42, 44 along the directional arrows shown in FIG. 37, which causes rotation of the handles 42, 44 about the handle axis point 58. Accordingly, the handles 42, 44 rotate the blade tangs 54, 56 via the pins 50, 52 fixed therebetween. Rotation of the handles 42, 44 about the handle axis point 58 causes the cutting blades 62, 64 to close. As shown in the closed position in FIG. 38, the protrusion 106 and the base end 108 rotate toward one another. Cutting is achieved when the blade 104 contacts the base end 108. In one embodiment, the cutting blades 62, 64 comprise jaws, similar to a pair of pliers, and the side cutter 102 is a wire cutter.

Figure 40:
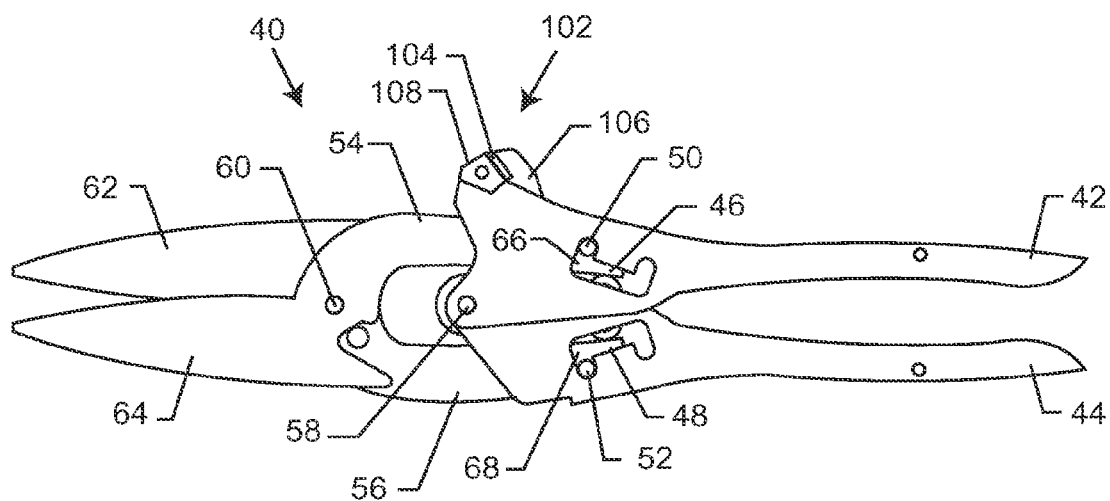
FIG. 40 is a top view of the tin snips of FIG. 39, in an open engaged position.

FIGS. 39-44 illustrate an alternative embodiment of the side cutter 102 integrated into the tin snips 40. As shown in FIG. 39, the side cutter 102 is in an engaged position such that the protrusion 106 and corresponding blade 104 may contact the base end 108. Again, the handles 42, 44 rotate about the handle axis point 58 when compressed toward one another along the directional arrows shown in FIG. 39. The integral blade tangs 54, 56 simultaneously close through the coupling of the pins 50, 52 residing in respective upper receiver notches 66, 68 formed in the slots 46, 48 of the handles 42, 44. In turn, the blades 62, 64 close toward one another about the base axis point 60. Accordingly, in the closed position as shown in FIG. 40, the protrusion 106 having the blade 104 thereon contacts the base end 108 to enable cutting therein.

Figure 41:
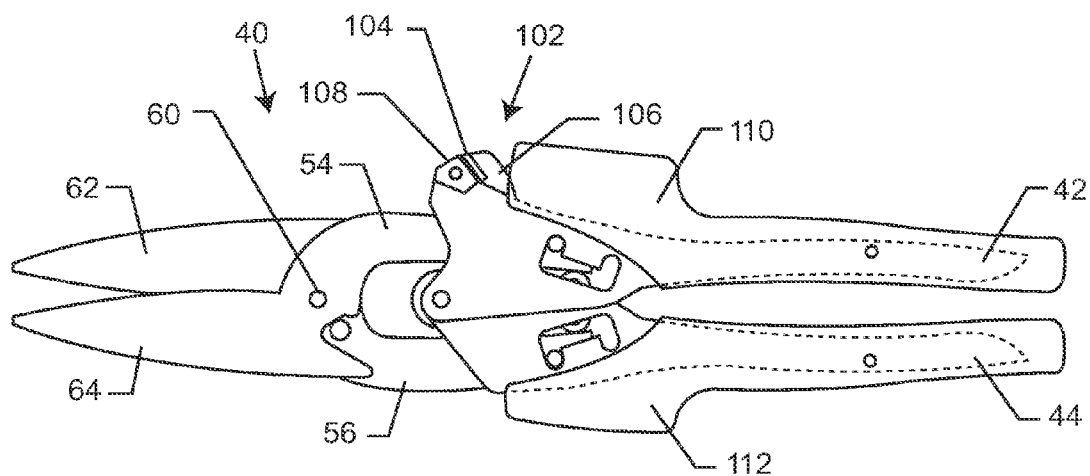
FIG. 41 is a top view of the tin snips of FIG. 39, illustrating the side cutter exposed from the handle housing when in the closed engaged position.

FIG. 41 illustrates the tin snips 40 further including a pair of handle housings 110, 112 overlying the handles 42, 44. When the tin snips 40 are in the closed position as shown in FIG. 41, the side cutter 102 is exposed from the handle housing 110 and the protrusion 106 and the corresponding blade 104 are able to contact the base end 108. As will be shown in FIGS. 42-44, the protrusion 106 and the blade 104 may be retracted within the handle housing 110 when the side cutter 102 moves to a disengaged position.

Figure 42:
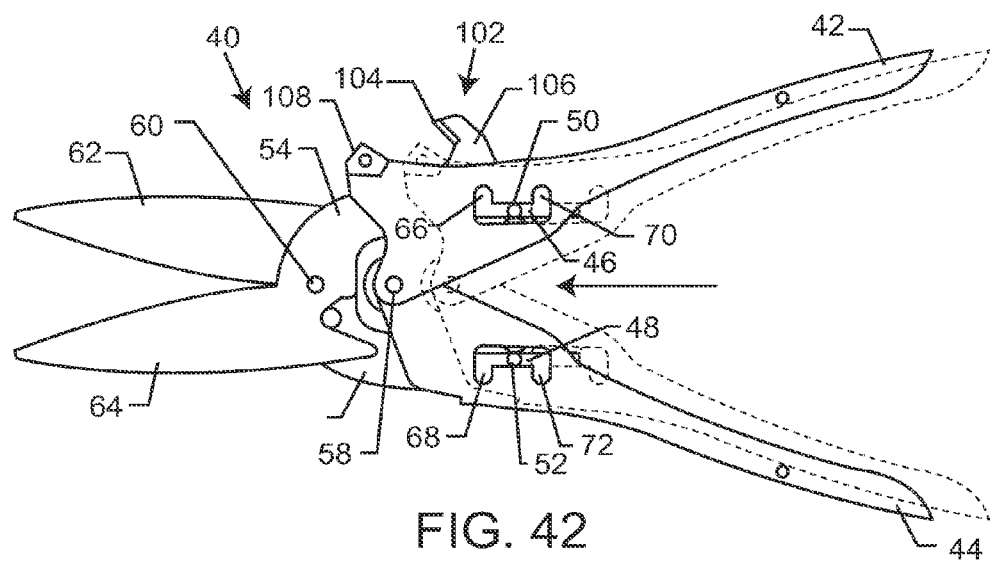
FIG. 42 is a top view of the tin snips of FIG. 39, illustrating movement of the side cutter from the engaged position to a disengaged position.

FIG. 42 illustrates movement of the side cutter 102 from an engaged position, where the protrusion 106 and the blade 104 may contact the base end 108, to a disengaged position, where the protrusion 106 and corresponding blade 104 reside within the handle housing 110 and are unable to contact the base end 108. As shown in FIG. 42, the pins 50, 52 are disengaged from the upper receiver notches 66, 68 and reside within the slots 46, 48 for transition to the lower receiver notches 70, 72. The handles 42, 44 and corresponding handle housings 110, 112 move forward along the directional arrows shown in FIG. 42 relative to the blade tangs 54, 56 and associated cutting blades 62, 64. The protrusion 106 and the blade 104 simultaneously slide back into a channel (not shown) formed at a front end 114 of the handle housing 110 for storage in the disengaged position. Accordingly, the blade 104 is encased and protected by the handle housing 110 and provides protection from potential injury as the blade 104 is no longer exposed.

Figure 43:
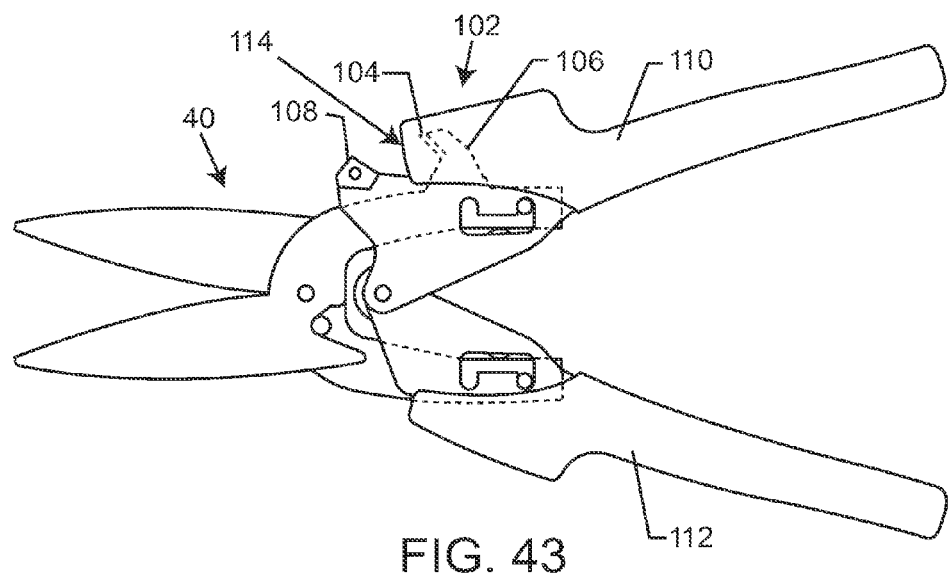
FIG. 43 is a top view of the tin snips of FIG. 39, illustrating the side cutter residing within a handle housing when in the open disengaged position.
Figure 44:
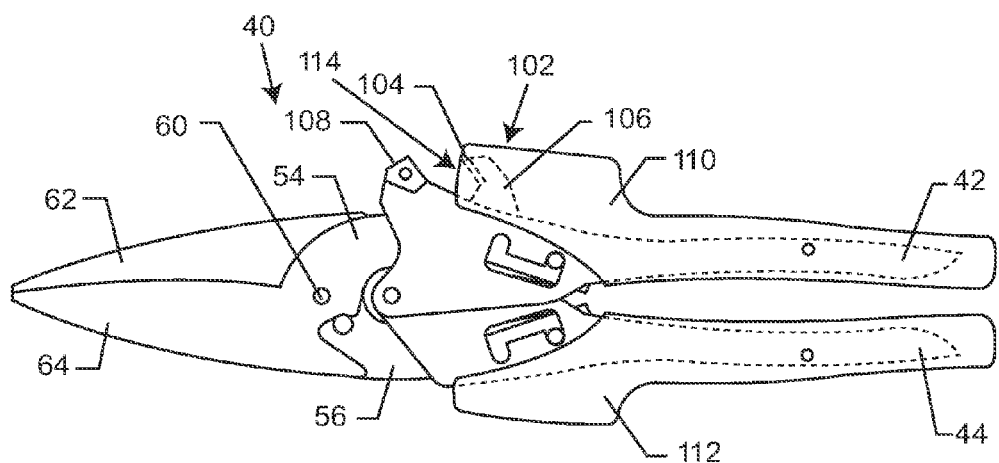
FIG. 44 is another top view of the tin snips of FIG. 39, illustrating the side cutter in a closed disengaged position.

FIG. 43 best illustrates the location of the protrusion 106 and the blade 104 within the handle housing 110. In this embodiment, the side cutter 102 is in a disengaged position such that movement of the tin snips 40 to a closed position (FIG. 44) does not result in the protrusion 106 or the blade 104 contacting the base end 108. Instead, the protrusion 106 and corresponding blade 104 are effectively encased within the handle housing 110. The protrusion 106 and the blade 104 simply rotate within the chamber in the handle housing 110 when the tin snips 40 moves to and from the closed and open positions. The respective handle housings 110, 112 may comprise a hard plastic or other soft rubber material that allow a user to better grip the tin snips 40.

FIGS. 45-48 further disclose another alternative embodiment of the tin snips 40 disclosed herein. This embodiment is similar to that shown in FIGS. 17-20 in that the handle axis point 58 is adjustable between fixed pivot points 114 and 116. Both of the fixed pivot points 114, 116 are attached to one of the handles 42. The other handle 44 has a pair of elongated slots 118, 120 oriented generally laterally on the handle 44. Each fixed pivot point 114, 116 is slidably disposed in one of the slots 118, 120 such that the handles 42, 44 are adjustable relative to one another. A selection lever 122 is pivotally attached to one of the handles 44 around a pivot point 124. The selection lever 122 has an activation plate 126 on one end and opposing notches 128, 130, which are each separately configured to engage one or the other of the fixed pivot points 114, 116. Engagement of a fixed pivot point 114, 116 by a notch 128, 130 fixes the handle axis point 58 to one of the fixed pins 114, 116. While notch 130 surrounds and engages fixed pivot point 116, notch 128 does not effectively surround fixed pivot point 114 as much as notch 130 disengages from fixed pivot point 116. When the lever 122 and notch 130 are disengaged from pin 116, the handles 42, 44 default to mechanical pivoting about the upper pin 114. The activation plate 126 is preferably configured to be triggered by a user's thumb or other digit disposed on the corresponding handle 44.

Figure 45:
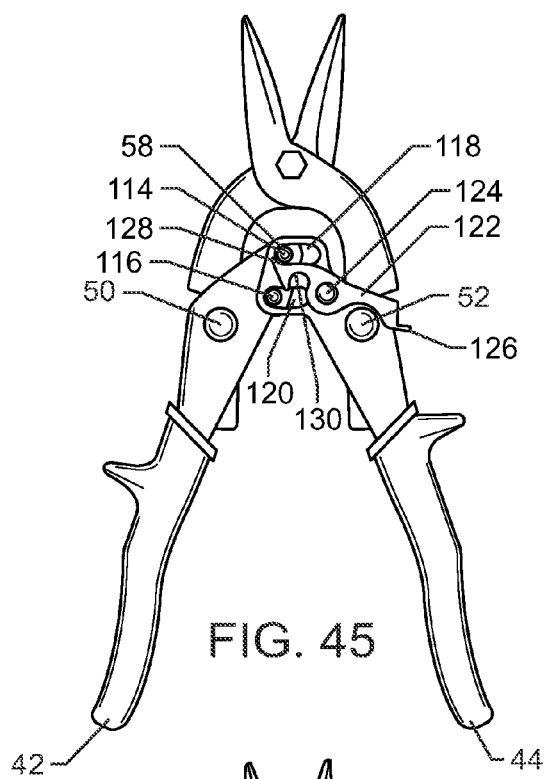
FIG. 45 is a top view of an alternate embodiment of tin snips allowing dual sliding adjustment of the handle axis, in an open position.
Figure 46:
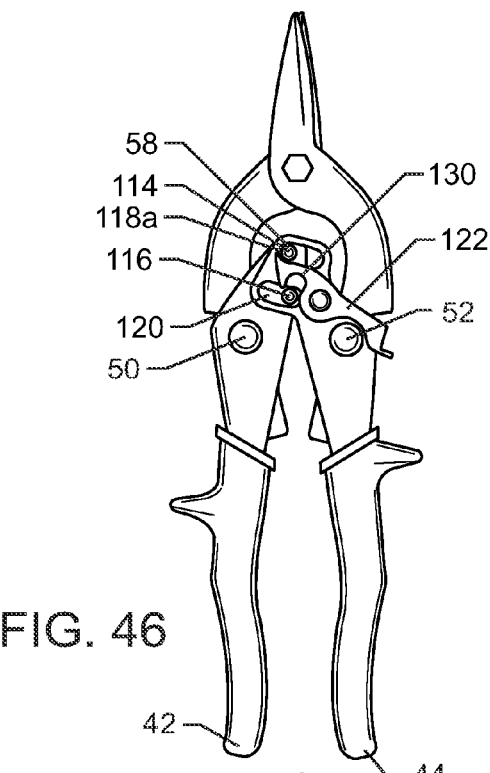
FIG. 46 is a top view of the tin snips illustrated in FIG. 45, in a closed position.

The handles 42, 44 can be configured to pivot about either fixed pin 114, 116 to have a similar effect of changing the handle axis point 58 as shown in FIGS. 17-20. FIGS. 45 and 46 illustrate the selection lever 122 in a down or default position. With the selection lever 122 in this position, the handles 42, 44 pivot about the fixed pivot point or upper fixed pin 114 as the handles 42, 44 are squeezed together. The fixed pivot point or lower fixed pin 116 is permitted to freely slide within elongated slot 120. This establishes the upper fixed pin 114 as the handle axis point 58.

Figure 47:
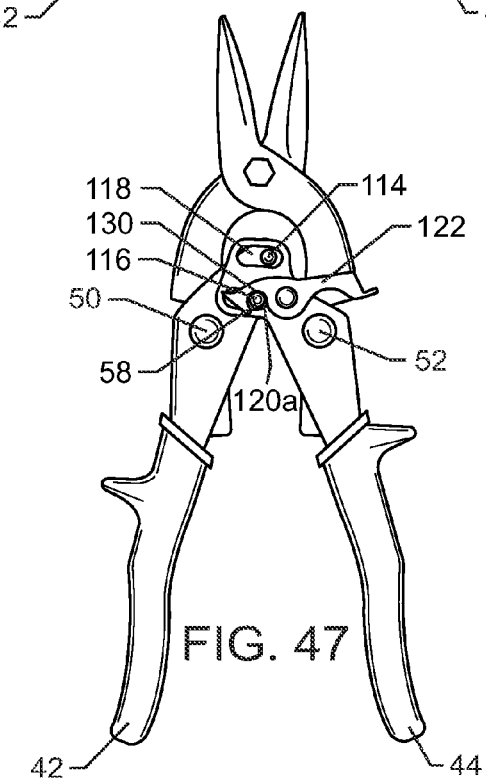
FIG. 47 is a top view of the tin snips illustrated in FIG. 45 pivoted into an alternate position, in an open position.
Figure 48:
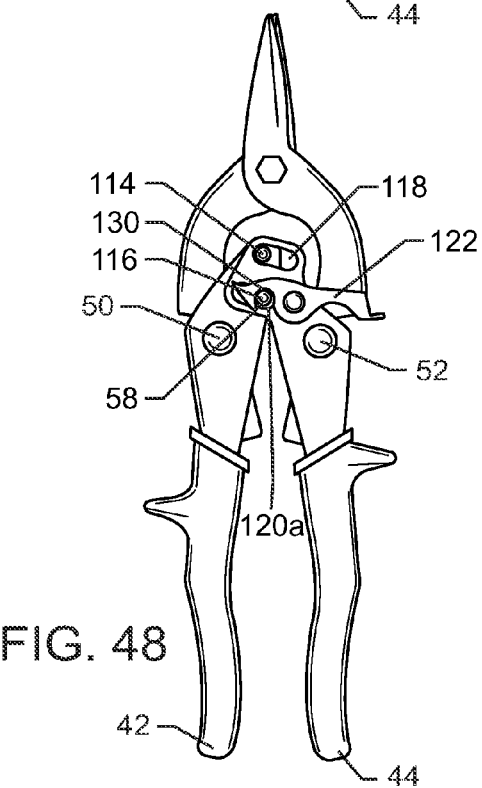
FIG. 48 is a top view of the tin snips illustrated in FIG. 47, in a closed position.

With the selection lever 122 in an up or operating position notch 130 engages lower fixed pin 116 as shown in FIGS. 47 and 48. In this configuration, the lower fixed pin 116 becomes the handle axis point 58 and the upper fixed pin 114 is permitted to slide freely in elongated slot 118. When the fixed pin 114, 116 is functioning as the handle axis point 58 it is disposed in a functional end 118a, 120a of the corresponding elongated slot 118, 120. The output force exerted at the material contact point 74 changes by movement of the handle axis point 58. By moving the handle axis point 58 from the upper fixed pin 114 to the lower fixed pin 116, the first stage force multiplier is increased as the ratio of the distances A/B (shown in FIG. 7) is increased. The second stage of the two-stage multiplier is unaffected because the ratio of the distances C/D (shown in FIG. 7) remains unchanged.

Although several embodiments have been described in some detail for purposes of illustration, various modifications may be made without departing from the scope and spirit of the invention. Accordingly, the invention is not to be limited, except by the appended claims.

What is claimed is:

1. Two-stage force multiplier tin snips, comprising:
   a pair of cutting blades and associated tangs, the blades and tangs being pivotable about a cutting blade axis; and
   a pair of handles pivotally attached to each other at upper and lower handle axes, each handle further being coupled to a respective tang by a respective tang pin;
   wherein the upper handle axis is disposed proximate to the cutting blade axis, and the lower handle axis is disposed distal from the cutting blade axis relative to the first handle axis; and
   wherein each of the handle axes comprise a pin fixed to one of the handles, and a corresponding elongated slot in the other one of the handles, the elongated slots oriented generally lateral relative to the tin snips and configured to receive the corresponding pin.

2. The tin snips of claim 1, further comprising a selection lever having a securing notch configured to selectively engage the lower axis fixed pin, the selection lever being pivotally attached to one of the pair of handles.

3. The tin snips of claim 2, wherein the lower handle axis corresponds to the lower axis fixed pin when the lower axis fixed pin is engaged with the securing notch on the selection lever, and the upper handle axis corresponds to the upper axis fixed pin when the lower axis fixed pin is disengaged from the securing notch on the selection lever.

4. The tin snips of claim 3, wherein the upper axis fixed pin is disposed in a functional end of the upper axis slot when the handles pivot about the upper handle axis.

5. The tin snips of claim 3, wherein the lower axis fixed pin is disposed in a functional end of the lower axis slot when the handles pivot about the lower handle axis.

6. Two-stage force multiplier tin snips, comprising:
   a pair of cutting blades and associated tangs, the blades and tangs being pivotable about a cutting blade axis;
   a pair of handles pivotally attached to each other at an upper handle axis and a lower handle axis, each handle further being coupled to a respective tang by a respective tang pin;
   wherein one of the pair of handles comprises an upper fixed pin and a lower fixed pin and the other of the pair of handles comprises upper and lower elongated slots oriented generally lateral relative to the tin snips, each elongated slot configured to receive the corresponding upper or lower fixed pin; and
   a selection lever having a securing notch configured to selectively engage the lower fixed pin, the selection lever being pivotally attached to one of the pair of handles.

7. The tin snips of claim 6, wherein the lower handle axis corresponds to the lower fixed pin when the lower axis fixed pin is engaged with the securing notch on the selection lever, and the upper handle axis corresponds to the upper fixed pin when the lower fixed pin is disengaged from the securing notch on the selection lever.

8. The tin snips of claim 7, wherein the upper fixed pin is disposed in a functional end of the upper slot when the handle axis is in the upper position.

9. The tin snips of claim 7, wherein the lower fixed pin is disposed in a functional end of the lower slot when the handle axis is in the lower position.

\* \* \* \* \*